United States Patent
Egashira et al.

(10) Patent No.: US 11,677,124 B2
(45) Date of Patent: Jun. 13, 2023

(54) BATTERY SYSTEM, AND ELECTRIC VEHICLE AND ELECTRIC STORAGE DEVICE INCLUDING BATTERY SYSTEM

(71) Applicant: SANYO Electric Co., Ltd., Osaka (JP)

(72) Inventors: Takuya Egashira, Hyogo (JP); Naotake Yoshida, Hyogo (JP); Daisuke Yamane, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 0 days.

(21) Appl. No.: 17/255,971

(22) PCT Filed: May 17, 2019

(86) PCT No.: PCT/JP2019/019680
§ 371 (c)(1),
(2) Date: Dec. 23, 2020

(87) PCT Pub. No.: WO2020/003801
PCT Pub. Date: Jan. 2, 2020

(65) Prior Publication Data
US 2021/0126328 A1    Apr. 29, 2021

(30) Foreign Application Priority Data
Jun. 26, 2018    (JP) .............................. JP2018-120849

(51) Int. Cl.
*H01M 50/578*    (2021.01)
*H01M 50/249*    (2021.01)
(Continued)

(52) U.S. Cl.
CPC ........... *H01M 50/578* (2021.01); *B60L 50/64* (2019.02); *H01M 10/46* (2013.01);
(Continued)

(58) Field of Classification Search
CPC .. H01M 10/46; H01M 2200/20; H01M 50/50; H01M 50/505; H01M 50/593;
(Continued)

(56) References Cited

U.S. PATENT DOCUMENTS

2006/0292437 A1* 12/2006 Matsumoto ........... H01M 50/10
429/82
2011/0076521 A1* 3/2011 Shimizu .............. H01M 50/529
429/82
(Continued)

FOREIGN PATENT DOCUMENTS

CN    1776936 A    5/2006
CN    104737328 A    6/2015
(Continued)

OTHER PUBLICATIONS

International Search Report of PCT application No. PCT/JP2019/019680 dated Aug. 13, 2019.
(Continued)

*Primary Examiner* — Matthew T Martin
*Assistant Examiner* — Katharine A Caughron
(74) *Attorney, Agent, or Firm* — WHDA, LLP

(57) ABSTRACT

A battery system includes a battery block having a plurality of square battery cells (1) stacked in one direction, parallel connection bus bars (5X), insulating plate (7), and lid plate (8) fixed to insulating plate (7). Each square battery cell (1) has a discharge port provided with discharge valve (14) and a sealing plate provided with positive and negative electrode terminals via an insulating material. Parallel connection bus bars (5X) are connected to the electrode terminals to connect some or all of square battery cells (1) in parallel. Insulating plate (7) is disposed on the surfaces of sealing plates of the plurality of square battery cells (1) and includes passing portions having openings provided at positions correspond-
(Continued)

ing to the discharge ports to pass the exhaust gas ejected from the discharge ports and pressing portions (22) disposed between parallel-connection bus bars (5X) and the sealing plates. Lid plate (8) faces discharge ports facing the openings of the passing portions.

8 Claims, 17 Drawing Sheets

(51) Int. Cl.
| | |
|---|---|
| *H01M 50/209* | (2021.01) |
| *H01M 50/183* | (2021.01) |
| *H01M 50/317* | (2021.01) |
| *H01M 50/147* | (2021.01) |
| *H01M 50/512* | (2021.01) |
| *H01M 10/46* | (2006.01) |
| *H01M 50/50* | (2021.01) |
| *H01M 50/588* | (2021.01) |
| *B60L 50/64* | (2019.01) |
| *H01M 50/593* | (2021.01) |

(52) U.S. Cl.
CPC ....... *H01M 50/147* (2021.01); *H01M 50/183* (2021.01); *H01M 50/209* (2021.01); *H01M 50/249* (2021.01); *H01M 50/317* (2021.01); *H01M 50/50* (2021.01); *H01M 50/512* (2021.01); *H01M 50/588* (2021.01); *H01M 50/593* (2021.01); *H01M 2200/20* (2013.01)

(58) Field of Classification Search
CPC ............. H01M 50/578; H01M 50/147; H01M 50/183; H01M 50/209; H01M 50/249; H01M 50/317; H01M 50/512
See application file for complete search history.

(56) References Cited

U.S. PATENT DOCUMENTS

| | | | |
|---|---|---|---|
| 2012/0094155 A1 | 4/2012 | Lim | |
| 2014/0017532 A1 | 1/2014 | Nishihara et al. | |
| 2015/0072193 A1* | 3/2015 | Balk | H01M 50/569 429/82 |
| 2015/0125727 A1* | 5/2015 | Lui | H01M 50/502 429/90 |
| 2015/0243947 A1 | 8/2015 | Seto et al. | |
| 2017/0033332 A1* | 2/2017 | Sakai | H01M 50/507 |
| 2018/0034014 A1 | 2/2018 | Ichikawa et al. | |
| 2019/0074554 A1* | 3/2019 | Li | H01M 50/287 |

FOREIGN PATENT DOCUMENTS

| | | |
|---|---|---|
| CN | 105518899 A | 4/2016 |
| CN | 107665962 A | 2/2018 |
| JP | 2011-076936 | 4/2011 |
| JP | 2012-089499 | 5/2012 |
| JP | 2015-207340 | 11/2015 |
| JP | 6230960 B2 * | 11/2017 |
| JP | 2017-216095 A | 12/2017 |
| JP | 2018-018795 A | 2/2018 |
| WO | 2012/133592 | 10/2012 |
| WO | 2014/064888 A1 | 5/2014 |
| WO | 2015/034662 A1 | 3/2015 |

OTHER PUBLICATIONS

Extended (Supplementary) European Search Report dated Jun. 24, 2021, issued in counterpart EP application No. 19826897.1. (11 pages).

English Translation of Chinese Search Report dated Jul. 5, 2022, issued in counterpart CN application No. 201980043003.4. (3 pages).

English Translation of Chinese Search Report dated Mar. 10, 2023 for the related Chinese Patent Application No. 201980043003.4.

\* cited by examiner

BATTERY SYSTEM, AND ELECTRIC VEHICLE AND ELECTRIC STORAGE DEVICE INCLUDING BATTERY SYSTEM

CROSS-REFERENCE TO RELATED APPLICATIONS

This application is a U.S. national stage application of the PCT International Application No. PCT/JP2019/019680 filed on May 17, 2019, which claims the benefit of foreign priority of Japanese patent application No. 2018-120849, filed on Jun. 26, 2018, the contents all of which are incorporated herein by reference.

TECHNICAL FIELD

The present invention relates to a battery system including a plurality of batteries, an electric vehicle including the battery system, and an electric storage device including the battery system.

BACKGROUND ART

A battery system in which a plurality of battery cells are stacked is used for various purposes. In this battery system, the output current can be increased by connecting a plurality of adjacent battery cells in parallel, and the output power can be increased by connecting the parallel-connected battery cells in series. Therefore, this battery system is suitably adopted for applications that require large output power. For example, as a power source device including a plurality of battery cells connected in parallel, the power source device disclosed in PTL 1 below is known.

CITATION LIST

Patent Literature

PTL 1: International Publication No. 2012/133592

SUMMARY OF INVENTION

In recent years, as a configuration for increasing the capacity of a power source device, a power source device including a plurality of battery cells connected in parallel, as exemplified in PTL 1, has attracted attention. However, in the power source device described in PTL 1, if a certain battery cell is internally short-circuited, a current may flow from another battery cell connected in parallel to the internally short-circuited battery cell into this battery cell to generate heat. In such a state, the battery cells connected in parallel to the internally short-circuited battery cells are externally short-circuited, and the temperature of the plurality of battery cells may rise to induce thermal runaway.

The present invention has been developed for the purpose of preventing the above adverse effects, and an important object of the present invention is to provide a technique for preventing the induction of thermal runaway in a power source device including a plurality of battery cells connected in parallel.

A battery system according to an aspect of the present invention includes a battery block including a plurality of square battery cells stacked in one direction, parallel connection bus bars, an insulating plate, and a lid plate fixed to the insulating plate. Each square battery cell has a discharge port provided with a discharge valve that opens at a set pressure and a sealing plate provided with positive and negative electrode terminals via an insulating material. The parallel connection bus bars are connected to the electrode terminals of the square battery cells to connect some oral of the square battery cells in parallel. The insulating plate is disposed on the surfaces of the sealing plates of a plurality of square battery cells. Further, the insulating plate includes passing portions having openings provided at positions corresponding to the discharge ports to pass the exhaust gas ejected from the discharge ports and pressing portions disposed between the parallel connection bus bars and the sealing plates. The lid plate faces discharge ports facing the openings of the passing portions.

An electric vehicle including a battery system having the components according to the above aspect includes the battery system, a running motor supplied with electric power from the battery system, a vehicle main body equipped with the battery system and the motor, and wheels that are driven by the motor to drive the vehicle main body.

An electric storage device including the battery system having the components according to the above aspect includes the battery system and a power source controller for controlling charging/discharging with respect to the battery system. The electric storage device allows the power source controller to charge the square battery cells with electric power from outside, and performs control to charge the battery cells.

According to the above configuration, when a gas is discharged from the discharge port, external force acts upward on the lid plate due to the discharged gas. Since the lid plate is configured to be connected to the insulating plate, the pressing portions of the insulating plate are displaced so as to push up the parallel connection bus bars by the external force generated by the gas. This makes it possible to cut off an external short circuit formed via parallel connection bus bars or an internally short-circuited square battery cell.

DESCRIPTION OF EMBODIMENT

Figure 1:
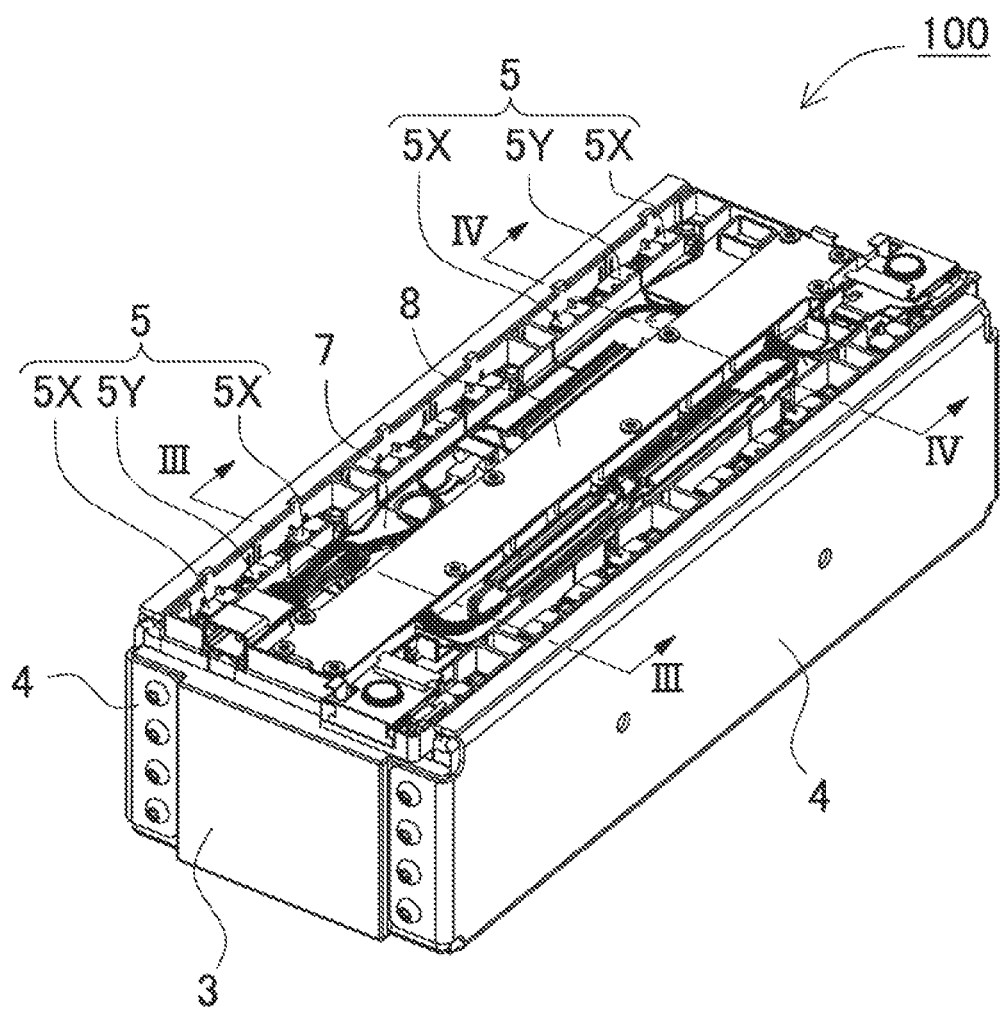
FIG. 1 is a perspective view of a battery system according to an exemplary embodiment of the present invention.

One point of interest of the present invention will be described first. The present inventors have studied a configuration in which a plurality of battery cells are connected in parallel as an example for increasing the capacity of the power source device. As described above, in the power source device including a plurality of battery cells are connected in parallel, if a certain battery cell is internally short-circuited, a current may flow from another battery cell connected in parallel to the internally short-circuited battery cell into this battery cell to generate heat. On the other hand, there is a battery cell provided with a safety mechanism that cuts off the electrical connection between the internal electrode inside the package can and the electrode terminal provided on the sealing plate as the internal pressure of the package can rises. As the safety mechanism, there is a current interrupt device (CID) disposed between the internal electrode and the electrode terminal inside the battery cell. In a power source device in which a plurality of battery cells are connected in parallel, safety can be enhanced by adopting a battery cell provided with this kind of safety mechanism. Specifically, when a certain battery cell is internally short-circuited, a current flows from the battery cell connected in parallel to the internally short-circuited battery cell to this battery cell. In principle, however, the CID of the internally short-circuited battery cell operates to cut off the current path connecting the positive and negative electrode terminals of the internally short-circuited battery cell. Accordingly, it is expected that an inflow current from the parallel-connected battery cell can be stopped.

However, the present inventors have found, in the process of studying a power source device including a plurality of battery cells connected in parallel, that the following problem may lead to a failure to cut off the inflow current from the parallel-connected battery cells even if they have a safety mechanism such as CID.

Generally, a battery cell has a sealing plate provided with positive and negative electrode terminals and a package can. The package can and the sealing plate are made of metal. Therefore, the electrode terminals are attached to the sealing plate via an insulating material called a gasket. A resin is used as this type of gasket. Assuming a state in which a certain battery cell is internally short-circuited, most of the energy possessed by the internally short-circuited battery cell is converted into heat. Therefore, if a large-capacity battery cell is internally short-circuited, the battery temperature may rise sharply to an extremely high temperature of 400° C. or higher. Since the gasket of the battery cell is made of a resin, the gasket melts when the battery temperature becomes extremely high (400° C. or higher). Accordingly, in a power source device including a plurality of battery cells connected in parallel, if a certain battery cell is internally short-circuited, the sealing plate of the internally short-circuited battery cell may come into contact with positive and negative electrode terminals. In such a state, even if the safety mechanism such as the CID of the internally short-circuited battery cell is activated and the electrode terminal of the internally short-circuited battery cell and the internal electrode are separated, another battery cell connected in parallel to the internally short-circuited battery cell is externally short-circuited via the sealing plate of the internally short-circuited battery cell. This may induce thermal runaway.

For this reason, the present inventors have diligently studied this problem and found that the gas discharged from the discharge port provided with the discharge valve of the battery cell can be used. More specifically, when the internal pressure of the package can of a battery cell rises, gas is discharged from the discharge port provided with the discharge valve that opens in accordance with the internal pressure. It has been found that the contact between the electrode terminal and the sealing plate can be prevented by pushing up the electrode terminal of the battery cell by using this gas, and an exemplary embodiment of the present invention has been conceived.

A battery system according to an aspect of the present invention includes a battery block including a plurality of square battery cells stacked in one direction, a parallel connection bus bar, an insulating plate, and a lid plate fixed to the insulating plate. Each square battery cell has a discharge port provided with a discharge valve that opens at a set pressure and a sealing plate provided with positive and negative electrode terminals via an insulating material. The parallel connection bus bars are connected to the electrode terminals of the square battery cells to connect some or all of the square battery cells in parallel with each other. The insulating plate is disposed on a surface of the sealing plate of the plurality of square battery cells. Further, the insulating plate includes passing portions having openings provided at positions corresponding to the discharge ports to pass the exhaust gas ejected from the discharge ports and pressing portions disposed between the parallel connection bus bars and the sealing plates. The lid plate faces discharge ports facing the openings of the passing portions.

According to the above configuration, when a gas is discharged from the discharge port, external force acts upward on the lid plate due to the discharged gas. Since the lid plate is configured to be connected to the insulating plate, the pressing portions of the insulating plate are displaced so as to push up the parallel connection bus bars by the external force generated by the gas. As a result, the electrode terminals to which the parallel connection bus bars are connected are pushed upward, so that even if the insulating material interposed between the electrode terminals and the sealing plate is melted by heat, the contact between the electrode terminals and the sealing plate can be prevented. Further, as described above, the insulating plate is displaced so as to push up the parallel connection bus bars, so that the insulating plate is displaced in the direction away from the square battery cell. Therefore, the effect of making it difficult for heat from the square battery cell to be transferred to the insulating plate can be expected, and damage to the insulating plate can be prevented even in a state in which the insulating material that insulates the electrode terminal and the sealing plate melts. The electrode terminal can be held through the insulating plate to effectively prevent the contact between the electrode terminal and the sealing plate.

Further, in the battery block, a plurality of parallel-connected units formed by connecting the square battery cells in parallel may be connected to each other in series, and the insulating plate may be provided between the adjacent parallel-connected units so as to have a plurality of slits extending in the width direction of the square battery cell.

According to the above configuration, when the insulating plate is displaced, the insulating plate is broken at a slit portion, and only the electrode terminals of the battery cell in an abnormal state can be pushed up by the insulating plate. Therefore, the external force caused by the gas is not dispersed and can be effectively used.

Further, the lid plate and the insulating plate are connected between the adjacent slits among the plurality of slits, and the coupling position between the adjacent slits may be eccentrically located from the center of the discharge port in the width direction of the square battery cell.

According to the above configuration, the rotational moment of the external force caused by the gas can be increased, and the electrode terminal on the side close to the connecting position can be effectively pushed up. More specifically, for a certain battery cell, by preventing contact between one of the positive and negative electrode terminals and the sealing plate, it is possible to prevent an external short circuit through the sealing plate. Accordingly, it is only required to push up one of the electrode terminals. According to this configuration, one of the electrode terminals can be effectively pushed up by eccentrically locating the connecting position.

Further, the coupling position between the adjacent slits may be provided at a position close to the electrode terminal on the positive side with respect to a plurality of square battery cells located below the coupling position and connected in parallel with each other.

According to the above configuration, the electrode terminal on the positive side can be pushed up by the insulating plate. In the case of a lithium ion battery, the electrode terminal on the positive side is made of aluminum, and the electrode terminal on the negative side is made of copper. Therefore, the electrode terminal on the positive side requires a smaller amount of work to hold the electrode terminal. Strictly speaking, since the internal electrode is also connected to the electrode terminal on the positive side, the insulating plate does not push up only the electrode terminal on the positive side. However, due to the difference in material between the electrode terminals, the structure including the positive and negative electrode terminals and the internal electrodes can be expected to allow the electrode terminal on the positive side to require a smaller amount of work to hold the electrode terminal because the center of gravity is slightly biased toward the negative side. Therefore, it is preferable to have a configuration to hold the electrode terminal on the positive side.

Further, the sealing plate may be a flexible plate material that deforms when the internal pressure rises due to an abnormality in the square battery cell, and the displacement amount of the sealing body accompanying a rise in internal pressure due to the abnormality in the square battery cell may be larger than the gap between the parallel connection bus bars and the pressing portion.

According to the above configuration, the electrode terminals can be pressed by the insulating plate by using not only the external force caused by the gas but also the deformation of the sealing body.

Further, the parallel connection bus bar may have a cut portion configured to have lower strength than other portions at the portion of the insulating plate against which the pressing portion abuts.

According to the above configuration, the pressing portion presses the cut portion of the parallel connection bus bar to break the cut portion. If the parallel connection bus bar can be broken, even though the sealing plate and the electrode terminal come into contact with each other, it is possible to prevent an external short circuit through the sealing plate.

An electric vehicle according to an aspect of the present invention includes the battery system, a running motor supplied with electric power from the battery system, a vehicle main body equipped with the battery system and the motor, and wheels that are driven by the motor to drive the vehicle main body.

An electric storage device according to an aspect of the present invention includes the battery system and a power source controller that controls charging/discharging of the battery system. The power source controller enables the square battery cell to be charged by electric power from the outside, and controls the square battery cell to be charged.

In the above configuration, when the parallel connection bus bar can be cut by external force via the pressing portion, even if the square battery cell is a battery cell that does not have a CID, it is possible to cut off an external short circuit formed via the parallel connection bus bar.

The exemplary embodiment of the present invention will be described below with reference to the accompanying drawings. However, the exemplary embodiment described below exemplifies a method and a configuration for embodying the technical idea of the present invention, and the present invention is not specified by the following methods and articles. Moreover, the members described in the claims are never specified as the members of the exemplary embodiment. In particular, the dimensions, materials, shapes, relative arrangements, and the like of the constituent members described in the exemplary embodiment are not intended to limit the scope of the present invention to the specific ones unless otherwise specified and are exemplary only. The sizes and positional relationships of the members illustrated in the respective drawings are sometimes exaggerated to clarify the explanation. Further, in the following description, the same names and reference numerals denote the same or equivalent members, and detailed descriptions thereof will be omitted as appropriate. Further, each element constituting the present invention may be configured such that a plurality of elements are composed of the same member and one member serves as a plurality of elements, or conversely, the function of one member can be implemented by a plurality of members in a shared manner. In addition, the contents described in some examples and an exemplary embodiment can be used in other examples and exemplary embodiments.

Figure 2:
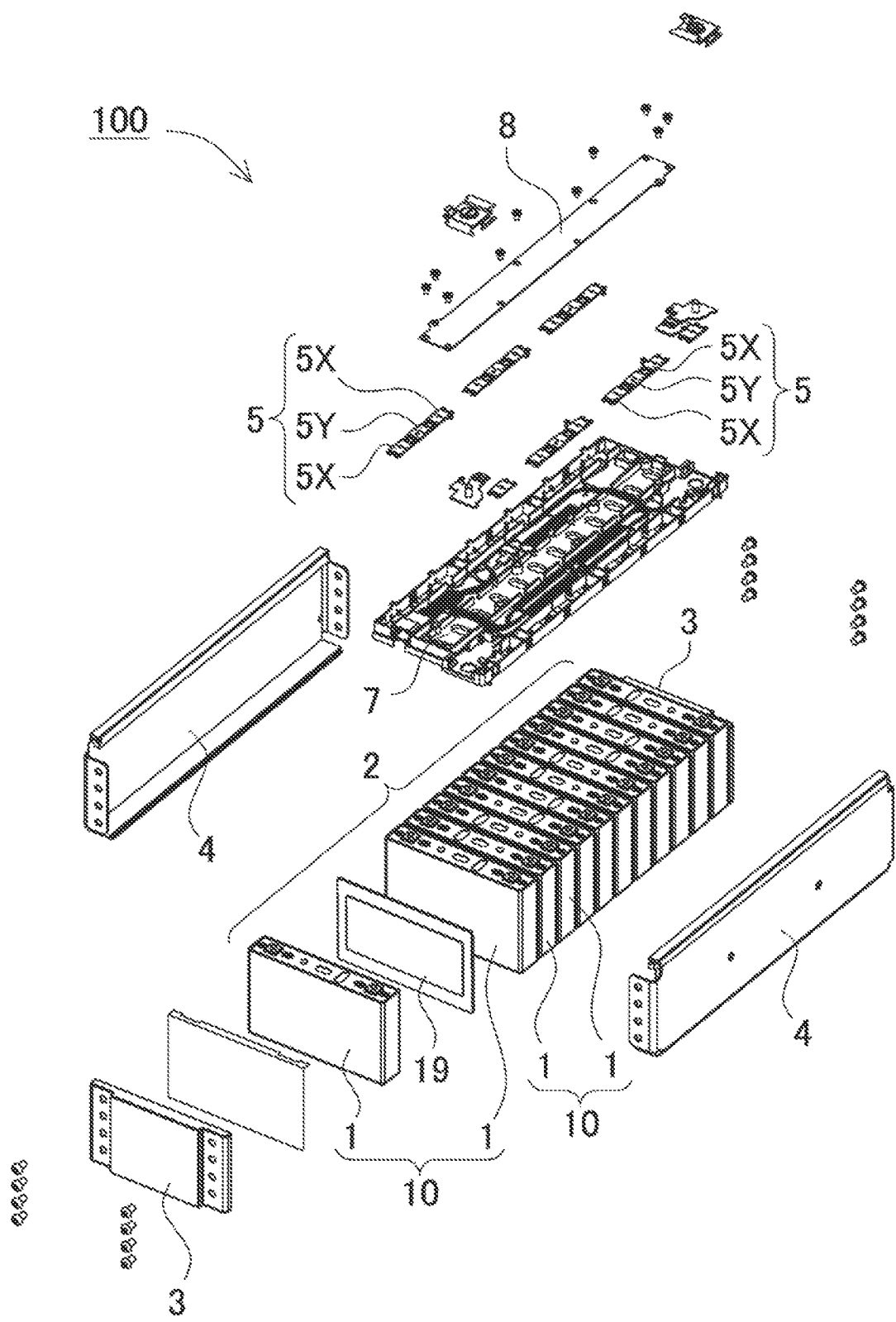
FIG. 2 is an exploded perspective view of the battery system illustrated in FIG. 1.

An optimum example for a vehicle battery system as an exemplary embodiment of the battery system will be described below with reference to the accompanying drawings. FIG. 1 is a perspective view of the battery system, FIG. 2 is an exploded perspective view of the battery system, and FIGS. 3 and 4 each are a vertical cross-sectional view of the battery system. Battery system 100 illustrated in FIGS. 1 to 4 includes battery block 2 formed by stacking a plurality of prismatic battery cells (hereinafter also referred to as "square battery cells") 1 and bus bars 5 that are connected to electrode terminals 13 of each of square battery cells 1 constituting battery block 2 and connect square battery cells 1 in parallel and in series. In battery system 100 of FIG. 2, a plurality of square battery cells 1 are connected in parallel and in series. Bus bar 5 includes parallel connection bus bars 5X that connect square battery cells 1 in parallel and series connection bus bar 5Y that connects square battery cells 1 in series. In battery system 100, square battery cells 1 can be connected in parallel to increase the output current, and connected in series to increase the output voltage. Therefore, in battery system 100, square battery cells 1 are connected in parallel and in series so as to obtain the optimum output current and output voltage for the application.

In battery block 2, a plurality of square battery cells 1 are stacked via insulating separator 19. Further, in battery block 2, a pair of end plates 3 are disposed on both end faces of a plurality of stacked square battery cells 1, and end plates 3 are connected by bind bar 4 to fix a plurality of square battery cells 1 in a pressurized state.

Square battery cell 1 is a non-aqueous electrolyte secondary battery such as a lithium ion secondary battery. Battery system 100 in which square battery cell 1 is a lithium ion secondary battery can increase the charge/discharge capacity with respect to the volume and weight. Instead of a lithium ion secondary battery, however, it is possible to use all other types of secondary batteries with a small internal resistance, large capacity, and large output.

Figure 5:
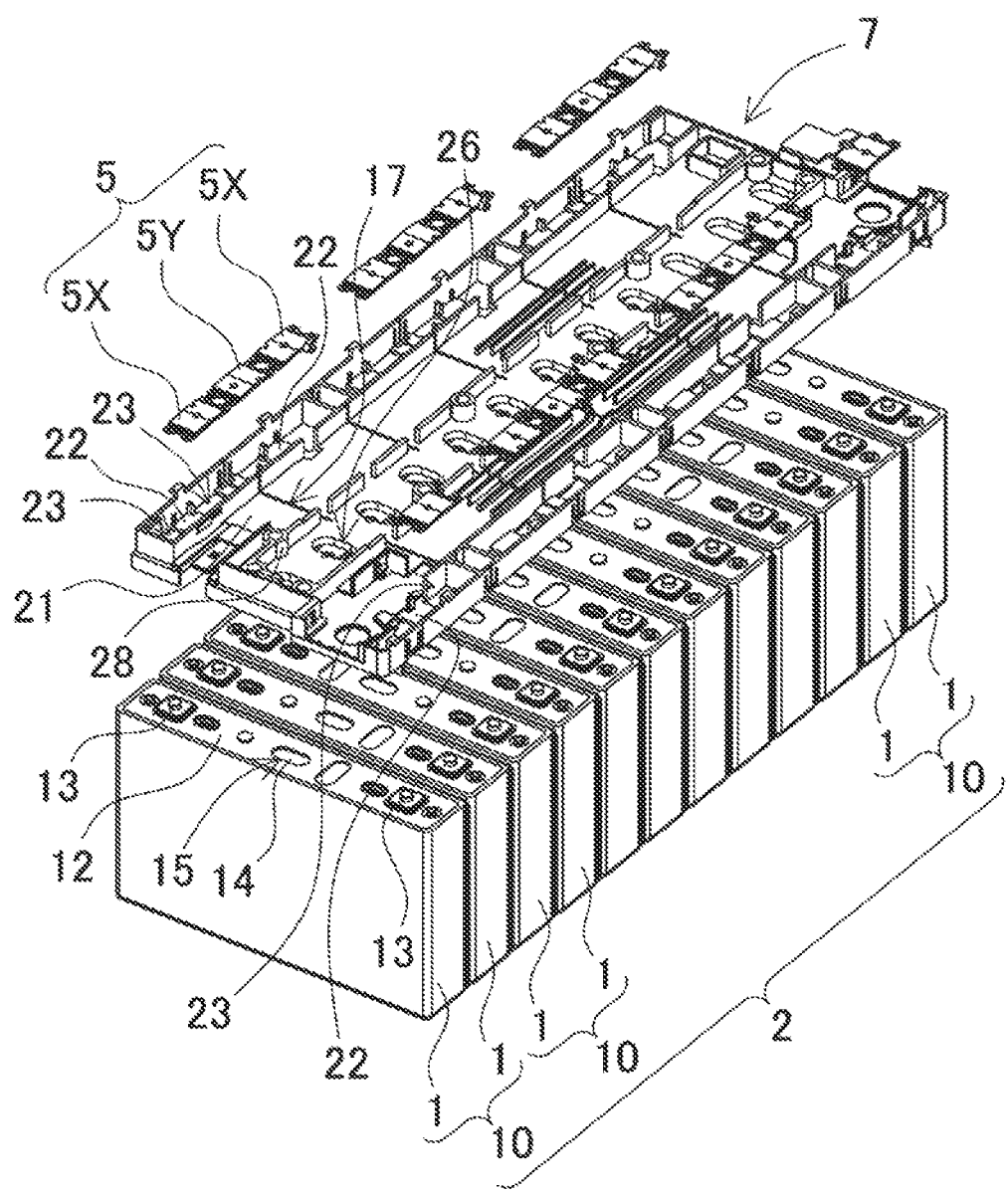
FIG. 5 is an exploded perspective view showing a positional relationship between a battery block, an insulating plate, and bus bars.
Figure 6:
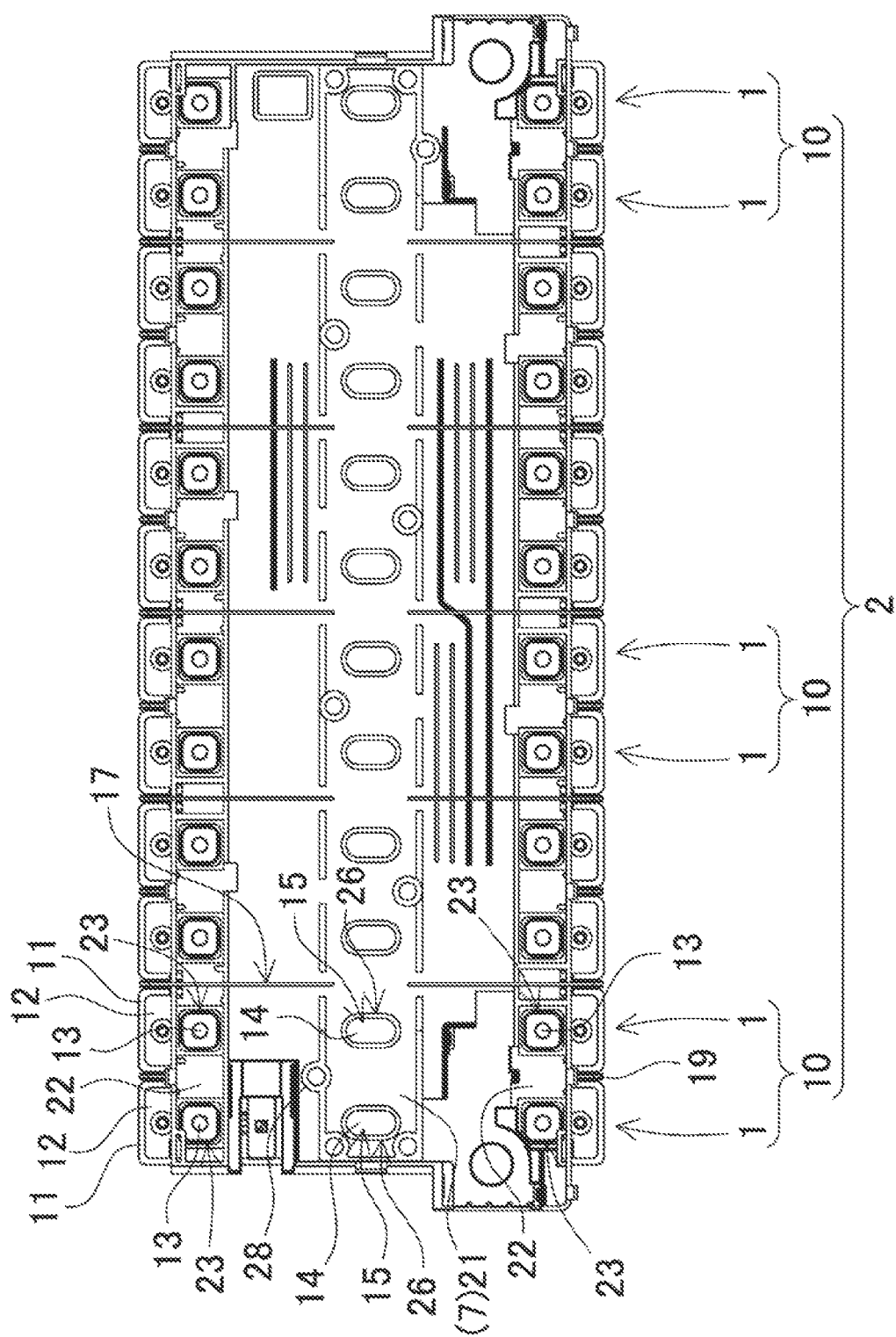
FIG. 6 is a plan view showing a positional relationship between the battery block and the insulating plate.
Figure 7:
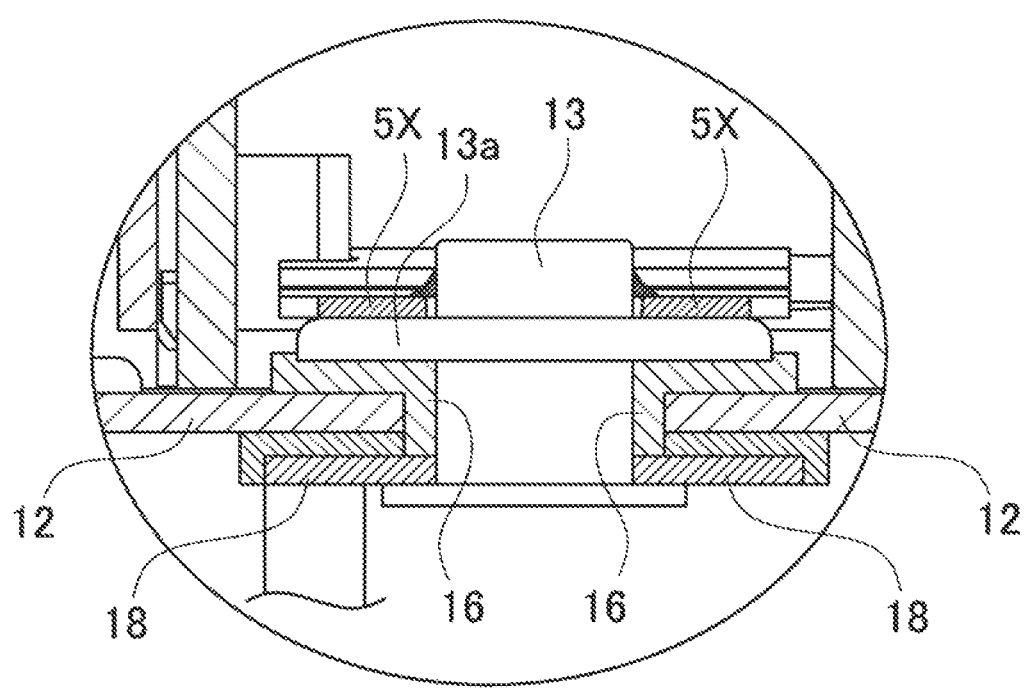
FIG. 7 is an enlarged cross-sectional view showing a connection structure between the sealing plate of a square battery cell and an electrode terminal.

As illustrated in the exploded perspective view of FIG. 5 and the plan view of FIG. 6, square battery cell 1 seals the opening of metal package can 11 whose thickness is thinner than the width of the upper side with sealing plate 12. Package can 11 is formed into a thick rectangular shape by deep-drawing a metal plate. Package can 11 and sealing plate 12 are made of a metal plate such as aluminum or an aluminum alloy plate. Sealing plate 12 airtightly seals the upper surface opening of package can 11. Further, as illustrated in the enlarged cross-sectional view of the main part of FIG. 7, sealing plate 12 fixes positive and negative electrode terminals 13 to both ends via insulating material 16. Insulating material 16 is a gasket made of a resin or rubber, and airtightly couples electrode terminal 13 and sealing plate 12 while insulating them. Positive and negative electrode terminals 13 fixed to sealing plate 12 are electrically connected to an electrode body (not illustrated) via current collecting member 18 inside square battery cell 1. Furthermore, sealing plate 12 is provided with discharge port 15 of discharge valve 14 between electrode terminals 13. Discharge valve 14 opens when the internal pressure of package can 11 rises above a predetermined value, and discharges the internal gas from discharge port 15.

Sealing plate 12 is a flexible plate material that is deformed in a state in which the internal pressure rises due to an abnormality such as internal short circuit of square battery cell 1. As sealing plate 12, a flexible metal plate such as an aluminum (including an aluminum alloy in this specification) plate can be used. By adjusting the material and thickness of metal sealing plate 12, it is possible to achieve flexibility that makes sealing plate 2 deform when the internal pressure rises due to internal short circuit. For example, aluminum alloy sealing plate 12 has a thickness of 0.5 mm to 2 mm, preferably 1 mm to 1.5 mm, and can achieve flexibility that makes sealing plate 12 deform when the internal pressure rises due to internal short circuit. However, sealing plate 12 need not always be a metal plate, and may be, for example, a plastic plate or a rubberlike elastic plate having excellent heat resistance.

Square battery cell 1 is provided with discharge valve 14 that opens when the internal pressure rises abnormally to prevent package can 11 from bursting. Square battery cell 1 in FIG. 5 is provided with discharge valve 14 at the center of sealing plate 12. Discharge valve 14 opens at a set pressure to discharge the gas inside. A pressure is set in discharge valve 14 to open the valve when the internal pressure rises to a predetermined pressure after the internal pressure rises due to an abnormality in square battery cell 1 and sealing plate 12 is deformed. In this specification, a parallel battery means a square battery cell connected in parallel with an arbitrary square battery cell.

Figure 8:
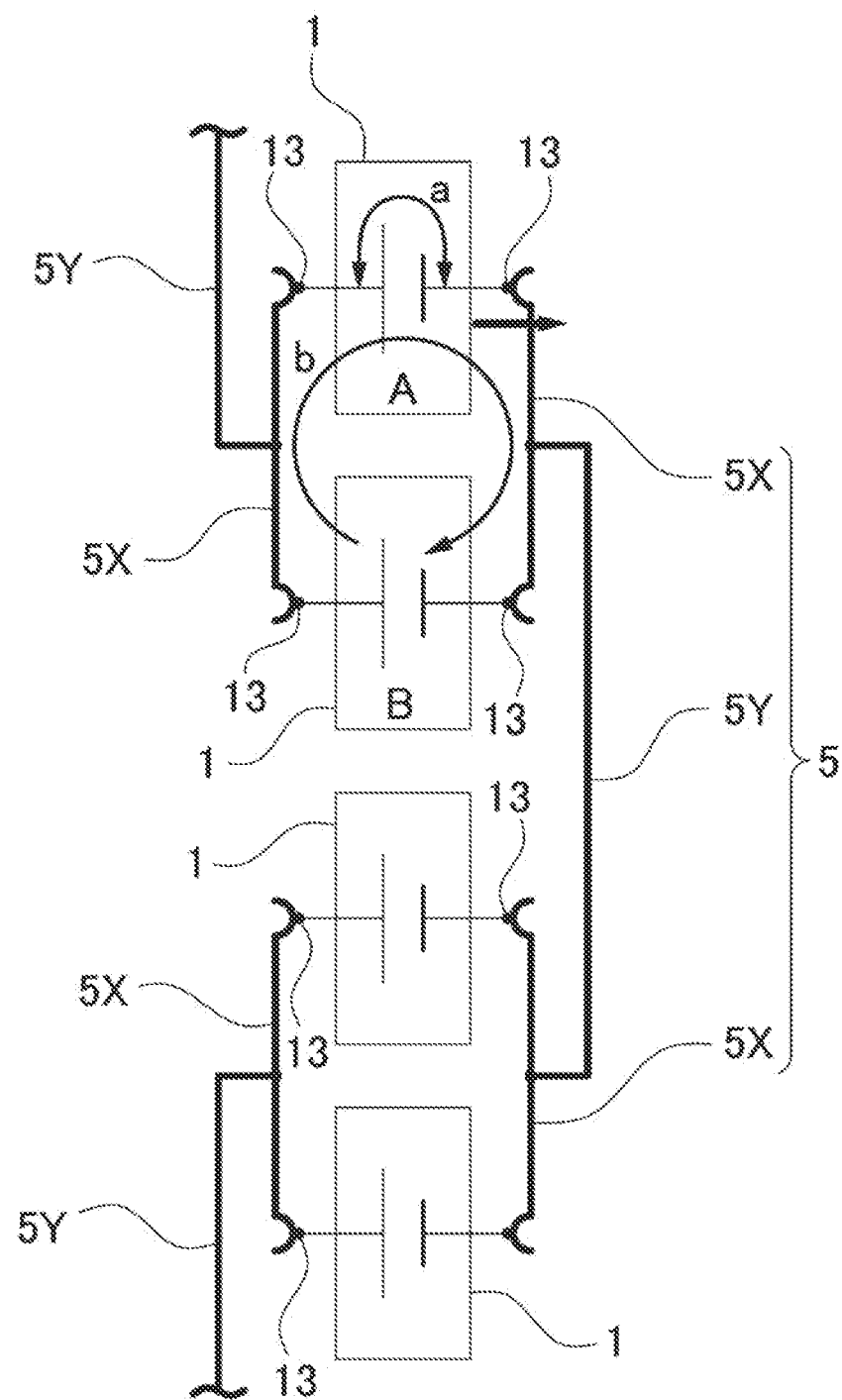
FIG. 8 is a principle diagram of a current cutoff unit that cuts off the short-circuit current of parallel batteries in a state in which any of the square battery cells is internally short-circuited.

The battery system is provided with insulating plate 7 and lid plate 8 in order to cut off an inflow current from square battery cell 1 connected in parallel with given square battery cell 1 when it is internally short-circuited, that is, a parallel battery. As illustrated in the schematic circuit diagram of FIG. 8, in the battery system in which the plurality of square battery cells 1 are connected in parallel, when given square battery cell A (uppermost square battery cell 1 in FIG. 8) is internally short-circuited (indicated by arrow a), a short-circuit current also flows (indicated by arrow b) in the adjacent parallel battery connected in parallel with square battery cell A, that is, square battery cell B (square battery cell 1 disposed in the second stage from the top). This is because, as illustrated in FIG. 8, when square battery cell A is internally short-circuited, square battery cell B of the parallel battery is short-circuited by an external short circuit formed outside. If any one of square battery cells 1 is internally short-circuited and an excessive current flows to cause thermal runaway, and if adjacent square battery cell 1 also undergoes thermal runaway due to an excessive current due to external short circuit, thermal runaway will be induced in a plurality of square battery cells 1, thus impairing safety.

Figure 9:
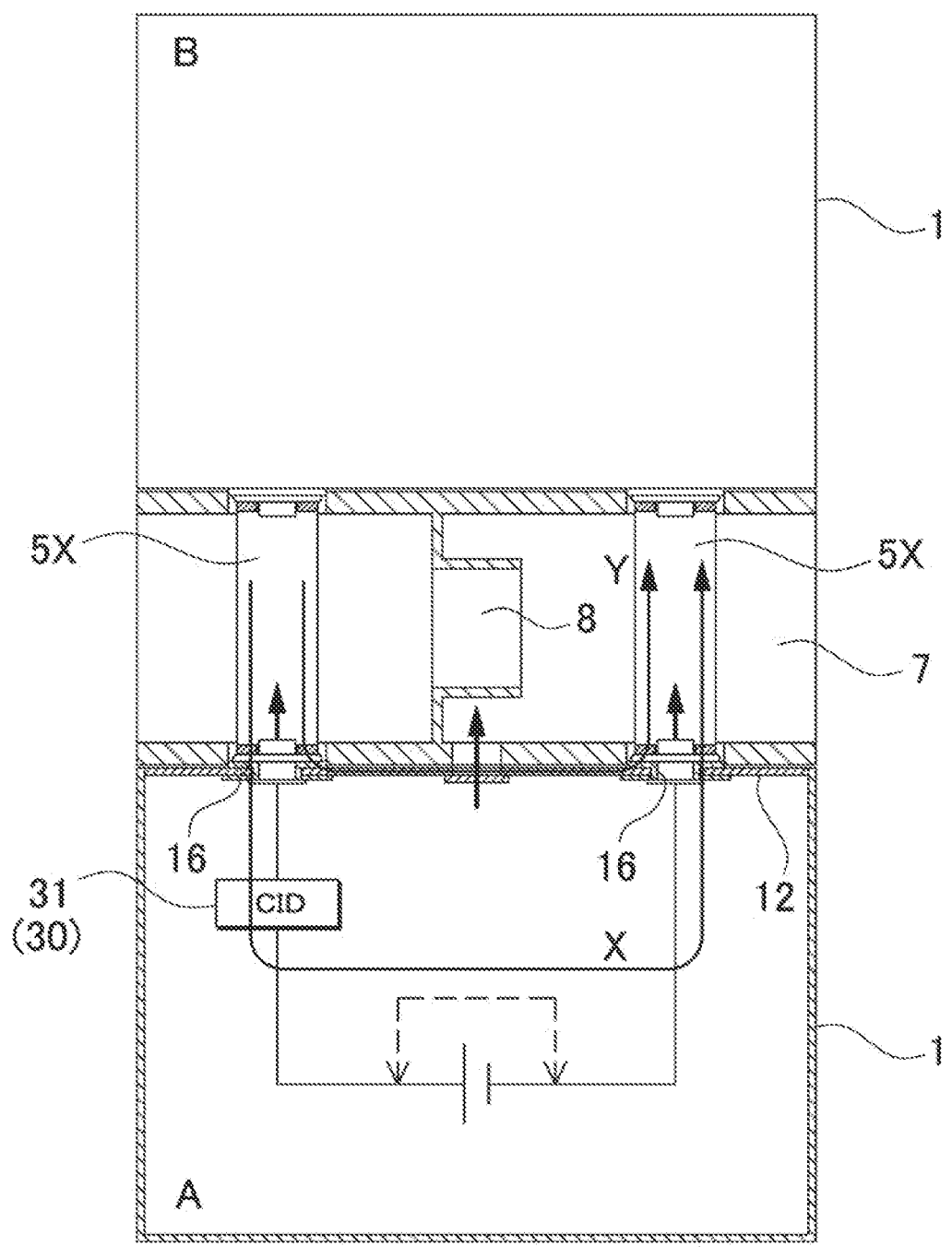
FIG. 9 is a schematic configuration diagram showing an example in which square battery cells connected in parallel are externally short-circuited.

A schematic configuration diagram of FIG. 9 illustrates a case in which a square battery provided with current cutoff mechanism 30 is used as square battery cell 1. Square battery cell 1 illustrated in FIG. 9 has built-in CID 31 serving as current cutoff mechanism 30 that cuts off the current path. When a large current flows, CID 31 cuts off the current. FIG. 9 illustrates the connection state of adjacent battery cells connected in parallel. However, FIG. 9 illustrates a state in which, in order to make it easier to understand how internal short circuit occurs and an overcurrent flows, the adjacent batteries that are actually stacked on each other are disposed to face each other. With reference to FIG. 9, when square battery cell A located on the lower side is internally short-circuited as indicated by the chain line, a current flows into square battery cell B which is the upper parallel battery connected in parallel to square battery cell A. This is because, as indicated by arrow X in FIG. 9, internally short-circuited square battery cell A becomes an external short circuit relative to square battery cell B of the parallel battery. In this way, when square battery cell A is internally short-circuited, square battery cell B of the parallel battery is short-circuited by the external short circuit formed outside. However, when CID 31 built in square battery cell A is activated, the external short circuit is cut off.

However, since the internal short circuit of square battery cell A itself cannot be stopped, square battery cell A generates heat. If the amount of heat generated by square battery cell A is large, insulating material 16 that insulates electrode terminal 13 and sealing plate 12 may melt out, and electrode terminal 13 and sealing plate 12 may come into contact with each other. This state is caused when flat plate portion 13a of electrode terminal 13 disposed on the upper surface of sealing plate 12 approaches and comes into contact with sealing plate 12 due to the weight of electrode terminal 13 or bus bar 5 connected to electrode terminal 13 or the weight applied from the electrode body (not illustrated) built in square battery cell 1 while insulating material 16 interposed between sealing plate 12 and electrode terminal 13 is thermally melted. When this state occurs, square battery cell B, which is a parallel battery; will be short-circuited again by an external short circuit formed by parallel connection bus bar 5X and sealing plate 12 which are electrically connected via electrode terminal 13 as indicated by arrow Y in FIG. 9. This may induce thermal runaway.

Figure 4:
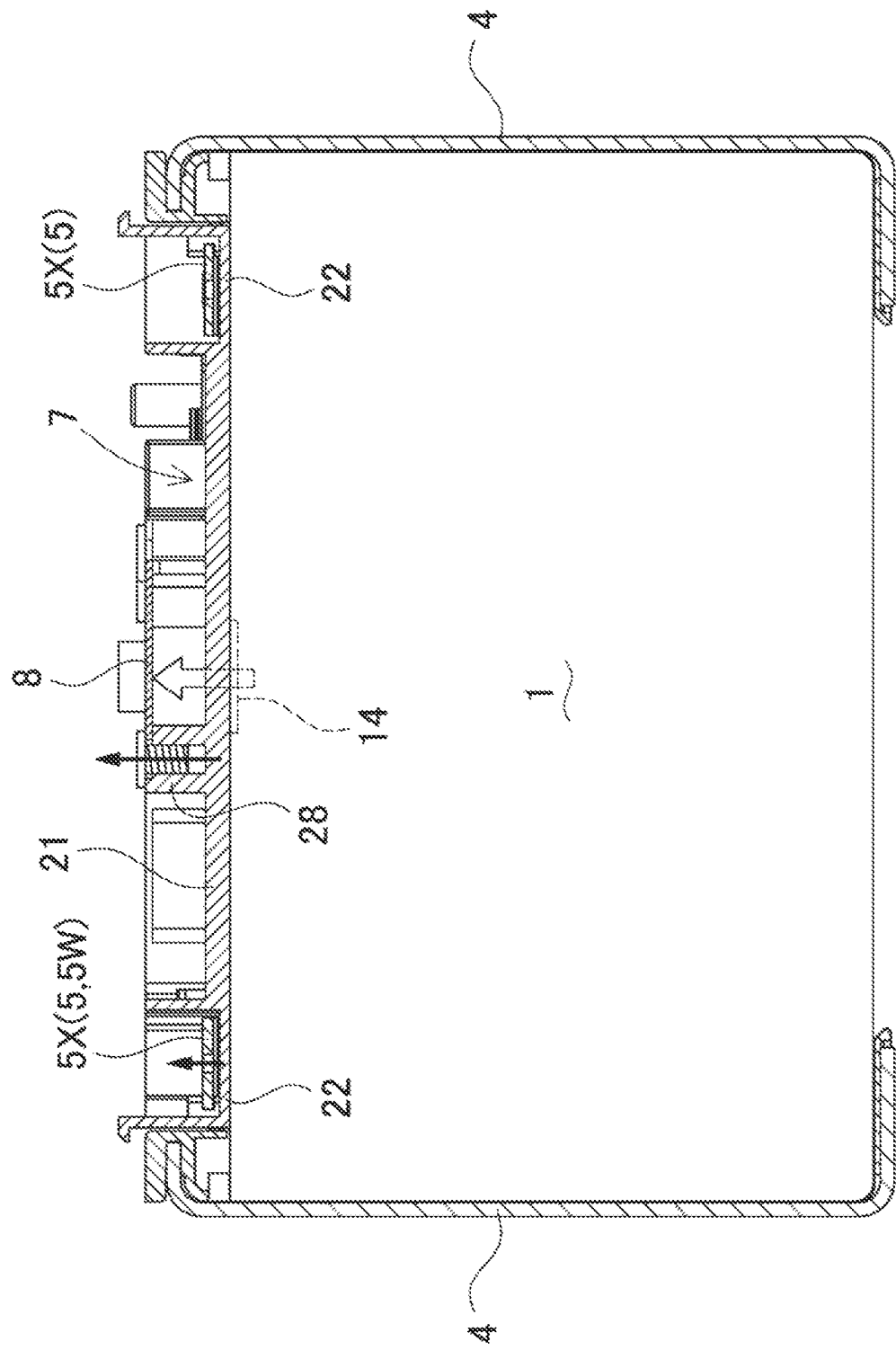
FIG. 4 is a sectional view taken along line IV-IV of the battery system illustrated in FIG. 1.

In order to prevent the above adverse effects, in a state in which exhaust gas is discharged from square battery cell 1 that has been internally short-circuited, external force is applied to lid plate 8 by the discharged gas in the upward direction to prevent the parallel battery from causing external short circuit. This prevents the induction of thermal runaway. When exhaust gas is discharged from internally short-circuited square battery cell 1, as illustrated in FIGS. 4 and 9, pressing portion 22 of insulating plate 7 displaces to push up parallel connection bus bar 5X due to force acting upward on lid plate 8. Insulating plate 7 is moved away from sealing plate 12 by lid plate 8. Lid plate 8 is moved by the exhaust gas ejected from discharge port 15 of discharge valve 14 that opens. Lid plate 8 is in the passage of the exhaust gas ejected from discharge port 15, and is moved by the kinetic energy of the exhaust gas ejected from discharge port 15.

As described above, when square battery cell 1 is internally short-circuited and insulating plate 7 is pushed up, electrode terminal 13 to which parallel connection bus bar 5X is connected is pushed up upward. Therefore, even if insulating material 16 interposed between electrode terminal 13 and sealing plate 12 is melted due to heat generation, it is possible to effectively prevent electrode terminal 13 from moving downward and coming into contact with sealing plate 12. Further, when insulating material 16 is melted, electrode terminal 13 becomes free with respect to sealing plate 12, but the positional relationship between the front, back, left, and right of electrode terminal 13 floating from sealing plate 12 is held at the fixed position of sealing plate 12 via parallel connection bus bar 5X, to which electrode terminal 13 is connected, and insulating plate 7. In particular, the external short circuit is generated by sealing plate 12 when positive and negative electrode terminals 13 come into contact with sealing plate 12 at the same time. Therefore, insulating plate 7 that is displaced so as to push up parallel connection bus bar 5X effectively prevents the pair of electrode terminals 13 from coming into contact with sealing plate 12 at the same time, and also prevents an external short circuit from being formed. Therefore, even if insulating material 16 that insulates electrode terminal 13 and sealing plate 12 is melted, electrode terminal 13 and sealing plate 12 are held in a non-contact state via insulating plate 7 that is urged upward, thereby effectively preventing an excessive current in square battery cell B and preventing the induction of thermal runaway. Further, as will be described in detail later, by adopting a structure in which sealing plate 12 is deformed due to an internal short circuit of square battery cell 1, insulating plate 7 can be pushed up by the deforming protruding portion of sealing plate 12. The synergistic effect of pushing up insulating plate 7 with the generated gas can prevent the contact between electrode terminal 13 and sealing plate 12 more reliably.

Figure 10:
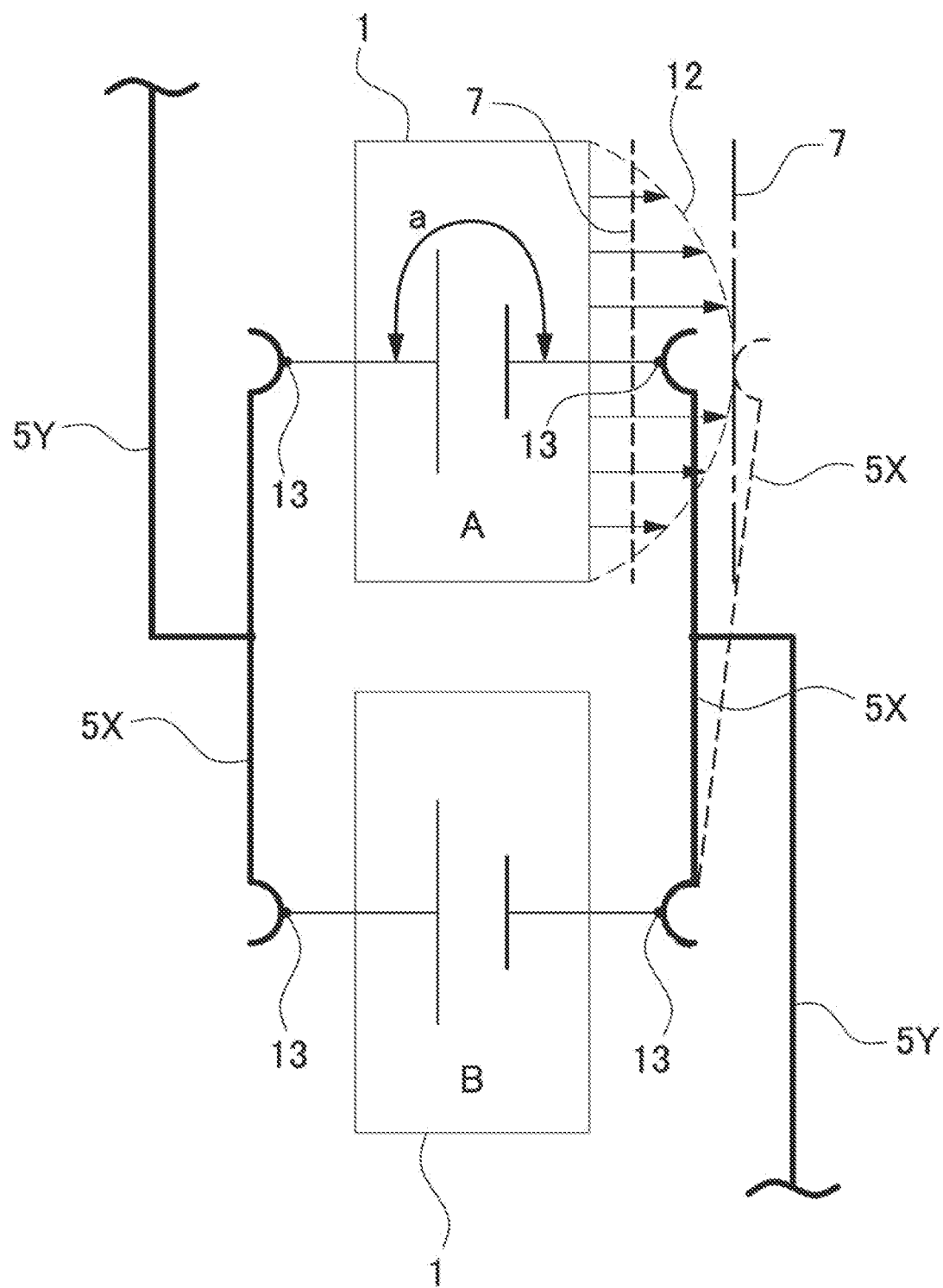
FIG. 10 is a principle diagram in which an insulating plate cuts off a short-circuit current between parallel batteries.

Further, in a state in which exhaust gas is discharged from internally short-circuited square battery cell 1, insulating plate 7 may cut off a short-circuit current in the parallel-connected parallel batteries by breaking parallel connection bus bar 5X. FIG. 10 is a principle diagram in which insulating plate 7 cuts off a short-circuit current between parallel batteries. The battery system illustrated in FIG. 10 shows a state in which bus bar 5 is broken by a short-circuit current in square battery cell A to cut off the current. FIG. 10 illustrates a state in which bus bar 5 is broken and separated from electrode terminal 13, but the bus bar itself can be broken to cut off current. Bus bar 5 is broken by insulating plate 7 disposed on the surface of sealing plate 12 of square battery cell 1. Insulating plate 7 is moved away from sealing plate 12 by lid plate 8 to break bus bar 5. Lid plate 8 is moved by the exhaust gas ejected from discharge port 15 of discharge valve 14 that opens. Lid plate 8 is in the passage of the exhaust gas ejected from discharge port 15, and is moved by the kinetic energy of the exhaust gas ejected from discharge port 15.

FIG. 10 illustrates a state in which insulating plate 7 breaks bus bar 5. Insulating plate 7 is disposed on the surface of sealing plate 12 of square battery cell 1. Both ends of insulating plate 7 are inserted between sealing plate 12 and parallel connection bus bar 5X. Insulating plate 7 is pulled up by lid plate 8 to break bus bar 5. Bus bar 5 in FIG. 10 breaks the connection portion with electrode terminal 13 to cut off short-circuit current between square battery cells 1 connected in parallel.

In battery system 100, as illustrated in FIGS. 2, 5, and 6, the plurality of square battery cells 1 are connected in parallel via parallel connection bus bars 5X to form parallel battery units 10. In addition, parallel battery units 10 are connected in series via series connection bus bars 5Y. In battery system 100 illustrated in FIGS. 2, 5, and 6, two adjacent square battery cells 1 are connected in parallel via bus bar 5 to form parallel battery unit 10. In addition, adjacent parallel battery units 10 are connected in series. However, in the battery system according to the present invention, a parallel battery unit need not always be formed by connecting two square battery cells but may be formed by connecting three or more square battery cells. Alternatively, all square battery cells can be connected in parallel.

As illustrated in FIGS. 4 and 5, insulating plate 7 is placed on the surfaces of sealing plates 12 and inserted between bus bars 5 and sealing plates 12 of square battery cells 1 whose ends are connected in parallel with each other. In battery system 100 in which two or three square battery cells 1 are connected in parallel, one insulating plate 7 is disposed at a position to face sealing plates 12 of all square battery cells 1 connected in parallel to each other, that is, two or three square battery cells 1. In a battery system in which four or more square battery cells are connected in parallel, a plurality of divided insulating plates are disposed at positions facing each other of the sealing plates of the square battery cells. Each of a plurality of divided insulating plates is disposed at a position to face the sealing plates of at least two or more square battery cells connected in parallel. Insulating plate 7 is pulled up by lid plate 8 to cut off short-circuit current. Since insulating plate 7 is pushed up by the exhaust gas ejected from discharge valve 14 of square battery cell 1 that has been internally short-circuited and deformed, bus bar 5 of square battery cell 1 that has been internally short-circuited is pushed up most strongly.

Figure 11:
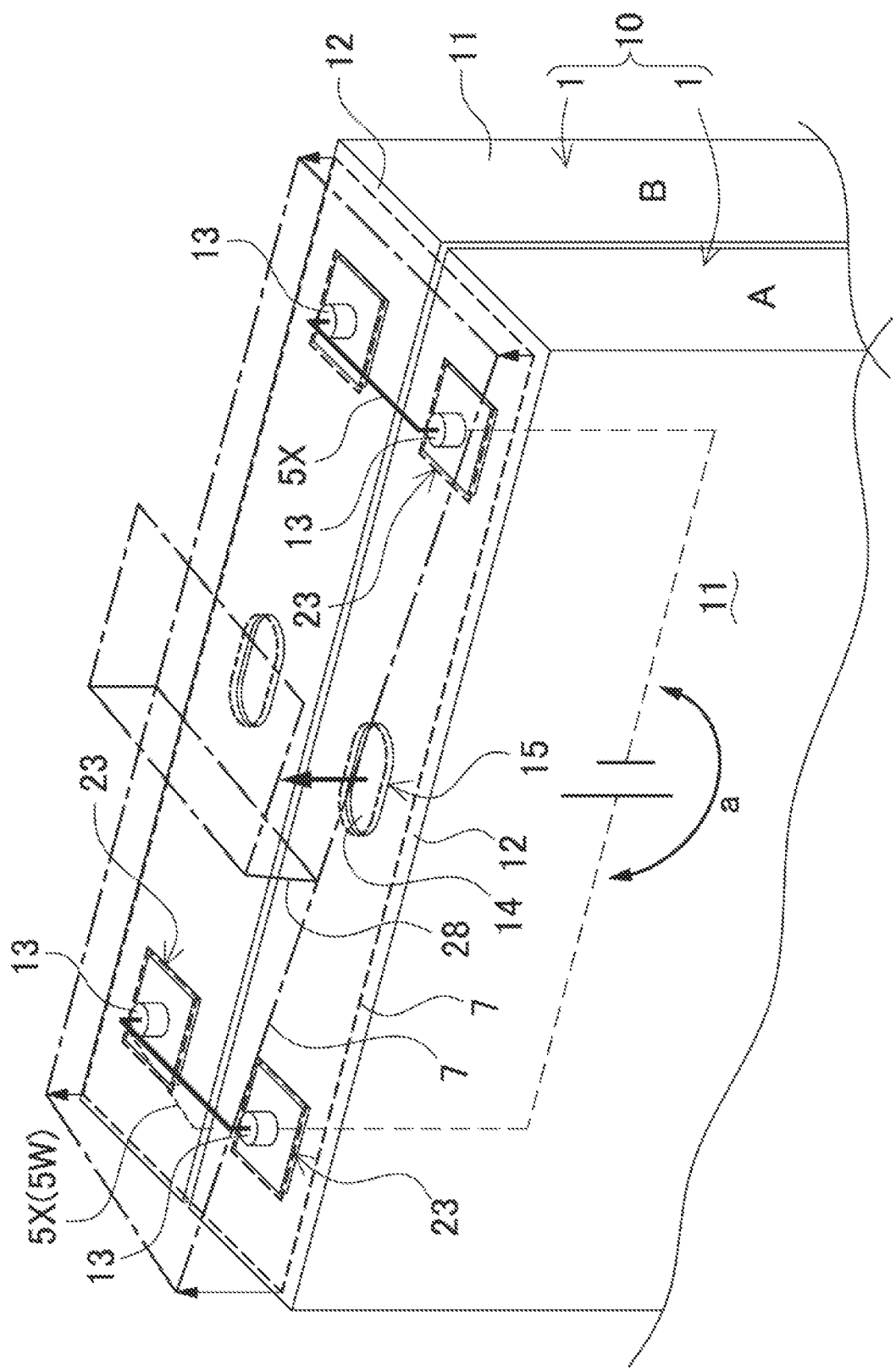
FIG. 11 is a schematic perspective view of a parallel battery unit, showing a state in which a short-circuit current between parallel batteries is cut off.
Figure 12:
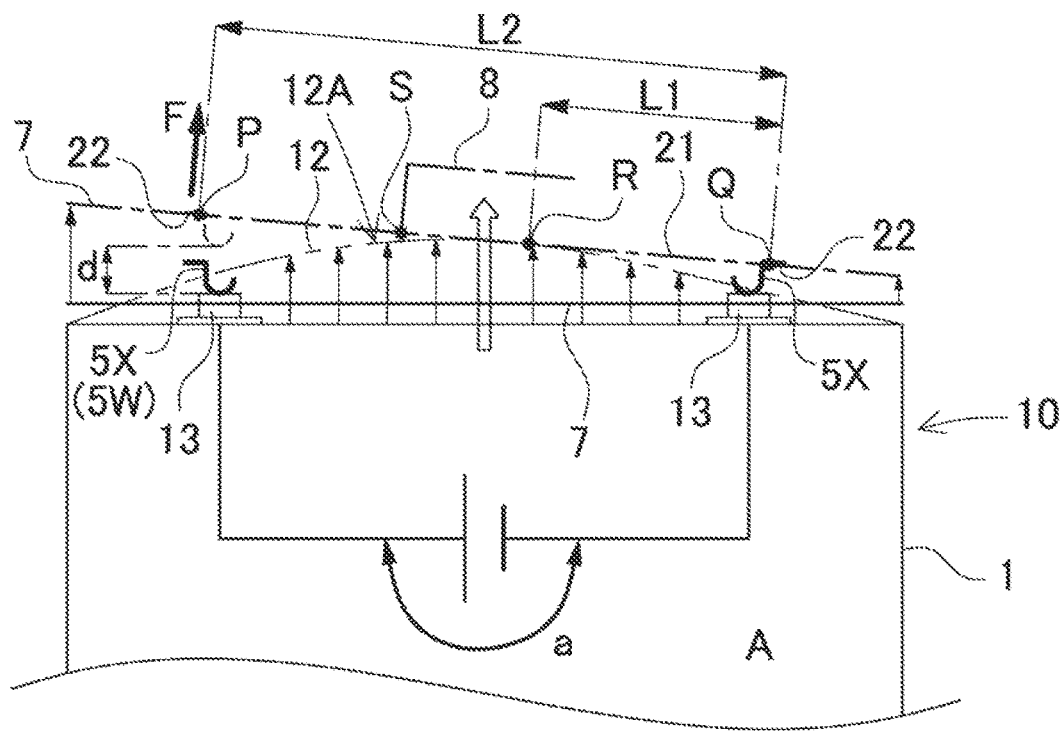
FIG. 12 is a vertical cross-sectional view of the parallel battery unit illustrated in FIG. 11.
Figure 13:
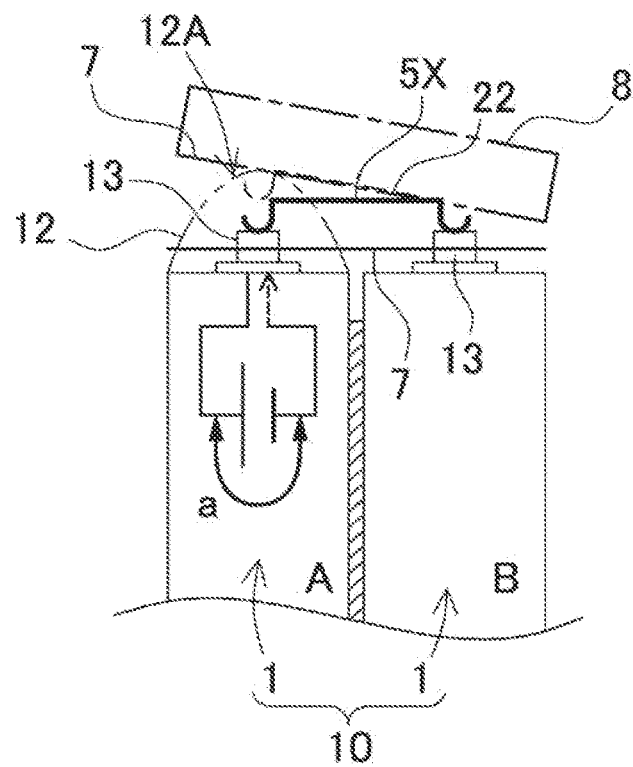
FIG. 13 is a horizontal cross-sectional view of the parallel battery unit illustrated in FIG. 11.

FIG. 11 is a schematic perspective view of parallel battery unit 10 in which two square battery cells 1 are connected in parallel. FIG. 11 illustrates a state in which one square battery cell A is internally short-circuited, discharge valve 14 is opened, ejected exhaust gas pushes up lid plate 8, and insulating plate 7 pulled up by lid plate 8 instantaneously interrupts short-circuit current. FIG. 12 is a schematic cross-sectional view of FIG. 11 taken along the longitudinal direction, and FIG. 13 is a schematic cross-sectional view of FIG. 11 taken along the lateral direction. Both FIGS. 12 and 13 illustrate a state in which insulating plate 7 is pulled up by lid plate 8. With reference to FIGS. 12 and 13, insulating plate 7 that is located at a position at which it is not pulled up by lid plate 8 is indicated by the chain line, and insulating plate 7 that is pulled up by lid plate 8 is indicated by the chain line.

Figure 3:
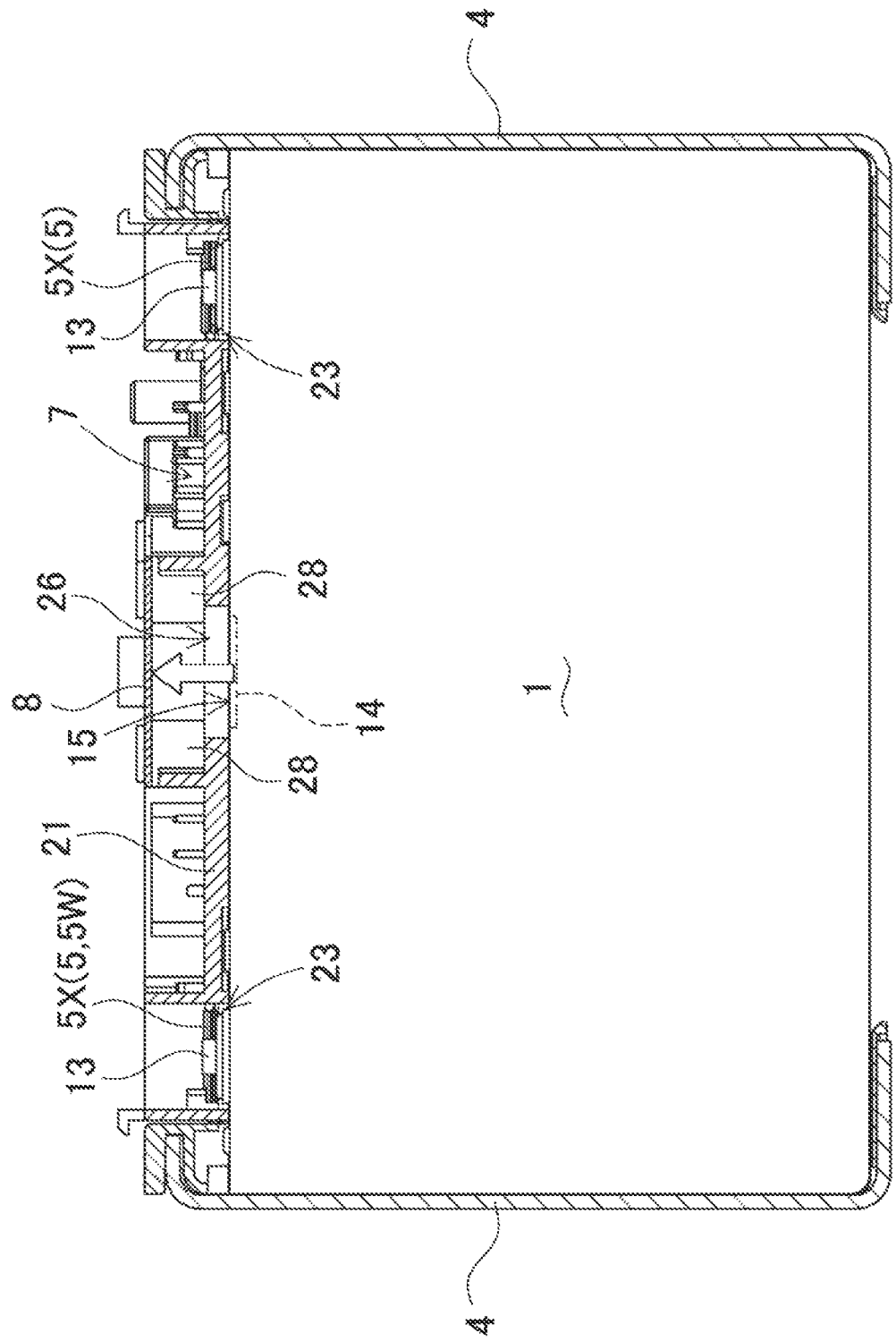
FIG. 3 is a sectional view taken along line III-III of the battery system illustrated in FIG. 1.

In parallel battery unit 10 illustrated in FIGS. 12 and 13, insulating plate 7 is disposed on the facing surface of sealing plate 12. Insulating plate 7 has a single plate shape, and is provided with through hole 23 into which electrode terminal 13 is inserted, as illustrated in FIGS. 3, 5, and 6. Through hole 23 has an inner shape larger than the outer shape of electrode terminal 13. Electrode terminal 13 is inserted into through hole 23 so as to be movable. Further, as illustrated in FIGS. 4 to 6, insulating plate 7 is provided with a pair of pressing portions 22 which are both ends of plate portion 21 and push up bus bar 5 between adjacent through holes 23. Insulating plate is a non-deformable plastic plate material or a metal plate having an insulating surface. As illustrated in FIGS. 11 to 13, insulating plate 7 is a rigid insulating plate that, when pulled up by lid plate 8, pushes up bus bar 5 by pressing portion 22 to cut off a short-circuit current. As illustrated in FIGS. 3 and 4, since lid plate 8 is coupled to insulating plate 7 via coupling portion 28, when lid plate 8 is pushed up by exhaust gas, insulating plate 7 is pulled up to break bus bar 5. lid plate 8 is disposed at a position where lid plate 8 is pushed up by the exhaust gas ejected from discharge valve 14 provided on sealing plate 12. Square battery cell 1 in FIGS. 3 and 4 is provided with discharge port 15 of discharge valve 14 at the center, and exhaust gas is ejected directly above sealing plate 12, so that lid plate 8 is disposed directly above discharge port 15 of discharge valve 14 in a horizontal posture.

The coupling position of insulating plate 7 of FIGS. 3 to 6 with respect to lid plate 8, that is, the position of coupling portion 28 is eccentrically located from the center of discharge port 15 toward one end. In parallel battery unit 10 illustrated in the cross-sectional view of FIG. 4, the strength of left bus bar 5 is weaker than that of right bus bar 5, and left bus bar 5 is more breakable by being pressed with the same pressing force than right bus bar 5. For example, if one of parallel connection bus bars 5X is made of aluminum or an aluminum alloy and another parallel connection bus bar 5X is made of copper or a copper alloy, aluminum or aluminum alloy bus bar 5 becomes weak bus bar 5W that is easily broken. Since parallel battery unit 10 can cut off the short-circuited battery by breaking one of bus bars 5, the short-circuited battery can be reliably cut off by breaking weak bus bar 5W. Lid plate 8 in FIG. 4 is configured to reliably break weak bus bar 5W by eccentrically locating coupling portion 28 between insulating plate 7 and lid plate 8 from the center of discharge port 15 toward weak bus bar 5W. Since insulating plate 7 in FIGS. 3 to 6 is provided with exhaust gas passing portion 26 at a position facing discharge port 15 Of discharge valve 14, coupling portion 28 is on one side of exhaust gas passing portion 26 and placed on a side closer to weak bus bar 5W that is easily broken. In this structure, lid plate 8 can strongly pull up the fragile side of insulating plate 7 via coupling portion 28 to reliably break weak bus bar 5W and shut off the short-circuited battery. When square battery cell 1 is a lithium ion battery, for example, electrode terminal 13 on the positive side is made of aluminum, and electrode terminal 13 on the negative side is made of copper. Therefore, parallel connection bus bar 5X coupled to electrode terminal 13 on the positive side becomes weak bus bar 5W that is easily broken. Accordingly, in this case, the coupling position between insulating plate 7 and lid plate 8 is preferably provided at a position close to electrode terminal 13 on the positive side with respect to a plurality of square battery cells 1 located below the coupling position and connected in parallel with each other.

Further, the battery system has a structure to effectively break bus bar 5 by the synergistic effect of using the force of pushing up insulating plate 7 by the exhaust gas ejected from discharge port 15 when discharge valve 14 is opened and pushing up the insulating plate with sealing plate 12 that deforms when the internal pressure rises due to an abnormality in square battery cell 1. FIGS. 12 and 13 illustrate a state in which the internal pressure of square battery cell 1 rises and the central portion of sealing plate 12 protrudes. As illustrated in FIGS. 12 and 13, since the outer peripheral edge of flexible sealing plate 12 is fixed to package can 11, sealing plate 12 is deformed such that the central portion protrudes when the internal pressure rises due to an abnormality such as an internal short circuit. When the internal pressure rises due to an abnormality in square battery cell 1 and sealing plate 12 is deformed, insulating plate 7 is pushed up by protruding portion 12A of sealing plate 12. Further, in this state, when discharge valve 14 is opened and exhaust gas is ejected from discharge port 15, insulating plate 7 is pushed up with both the pushing force due to the deformation of sealing plate 12 of square battery cell 1 and the force of the exhaust gas ejected from discharge port 15 of discharge valve 14 with which lid plate 7 is pushed up, to break parallel connection bus bar 5X. This structure pushes up the insulating plate by both the kinetic energy of the exhaust gas ejected from discharge valve 14 that opens and the deformation of sealing plate 12, so that the short-circuited battery between parallel-connected batteries can be shut off quickly and more reliably.

With reference to FIGS. 5 and 6, battery system 100 has insulating plate 7 disposed on the upper surface of battery block 2, that is, on the electrode surfaces on which sealing plates 12 of the plurality of square battery cells 1 are disposed in the same plane. Insulating plate 7 and lid plate 8 each have a plate shape extending in the stacking direction of parallel battery units 10. Insulating plate 7 illustrated in FIGS. 5 and 6 is provided with slit 17 between adjacent parallel battery units 10, and a plurality of plate portions 21 are disposed via slits 17. Lid plate 8 and insulating plate 7 are coupled to each other between slits 17 via coupling portions 28, and the coupling position is disposed toward weak bus bar 5W from the center of discharge port 15. Insulating plate 7 and lid plate 8 illustrated in FIGS. 5 and 6 are disposed in a staggered manner such that the connecting positions between slits 17, that is, the positions of coupling portions 28 are alternating in the right-left direction in the stacking direction of parallel battery units 10. This structure can reliably break parallel connection bus bars 5X of series-connected parallel battery units 10, which are weak bus bars 5W disposed alternately on the left and right, that is, in a staggered pattern, by disposing coupling portions 28 of insulating plate 7 and lid plate 8 in a staggered manner in the stacking direction of parallel battery units 10.

In battery system 100 described above, as illustrated in FIGS. 11 to 13, when square battery cell A is internally short-circuited, sealing plate 12 is deformed and protrudes due to an increase in internal pressure, discharge valve 14 is opened, and exhaust gas is ejected. Then, insulating plate 7 is pushed up to the position indicated by the chain line. Insulating plate 7 is configured such that pressing portion 22 pushes up bus bar 5 and breaks bus bar 5X. Insulating plate 7 cuts parallel connection bus bar 5X or separates the connection between parallel connection bus bar 5X and electrode terminal 13 to break bus bar 5. Broken bus bar 5 prevents a parallel battery from externally short-circuiting and cuts off a short-circuit current flowing through square battery cell B which is the parallel battery.

As illustrated in FIG. 12, insulating plate 7 pushed up by the deformation of sealing plate 12 makes breaking force acting in the direction of separating bus bar 5 from electrode terminal 13, with position R where insulating plate 7 in contact with protruding portion 12A of sealing plate 12 serving as a force point, position Q where insulating plate 7 pushes up bus bar 5 and does not separate serving as a fulcrum, and position P where insulating plate 7 pushes up bus bar 5 and separates serving as a working point. As illustrated in FIG. 12, insulating plate 7 pushed up by the exhaust gas ejected from discharge port 15 upon opening of discharge valve 14 makes breaking force acting in the direction of separating bus bar 5 from electrode terminal 13, with position R where insulating plate 7 in contact with protruding portion 12A of sealing plate 12 serving as a fulcrum, position S where coupling portion 28 pulls up insulating plate 7 serving as a force point, and position P where insulating plate 7 pushes up bus bar 5 and separates serving as a working point. That is, the breaking force generated by the deformation of sealing plate 12 and the breaking force generated by the kinetic energy of the exhaust gas act on insulating plate 7. Resultant force F of those breaks bus bar 5. Insulating plate 7 in FIG. 11 pushes up bus bar 5 connected to each of electrode terminals 13 (four electrode terminals 13 in FIG. 11) so as to separate bus bar 5 from electrode terminal 13. Bus bar 5 is separated from electrode terminal 13 at the portion where the breaking strength is the weakest.

For example, in the battery system in which one electrode terminal 13 of square battery cell 1 and bus bar 5 connected to electrode terminal 13 are made of aluminum, and another electrode terminal 13 and bus bar 5 connected to electrode terminal 13 are made of copper (in this specification, metals such as aluminum and copper include alloys), since the coupling strength of aluminum is weaker than that of copper, the connection portion between electrode terminal 13 made of aluminum and bus bar 5 is separated.

With reference to FIG. 12, when insulating plate 7 pushed up by protruding portion 12A of sealing plate 12 and pulled up by coupling portion 28 separates bus bar 5 from electrode terminal 13 and breaks bus bar 5 at point P, flat insulating plate 7 is pressed by the curved surface of protruding portion 12A and is inclined. In this state, inclined insulating plate 7 is configured such that the distance between points P and R is longer than the distance between points R and Q. This is because when insulating plate 7 is inclined, point R, which is the contact point between protruding portion 12A of sealing plate 12 and insulating plate 7, approaches point Q. As point R, which is the contact point, approaches point Q, the ratio between distance (L1) from point Q to point R and distance (L2) from point Q to point P, that is, leverage (L2/L1), increases, and the distance by which bus bar 5 is separated from electrode terminal 13 at point P, that is, gap (d) between electrode terminal 13 and bus bar 5, increases. When gap (d) between electrode terminal 13 and bus bar 5 increases, short-circuit current can be reliably cut off.

Figure 14:
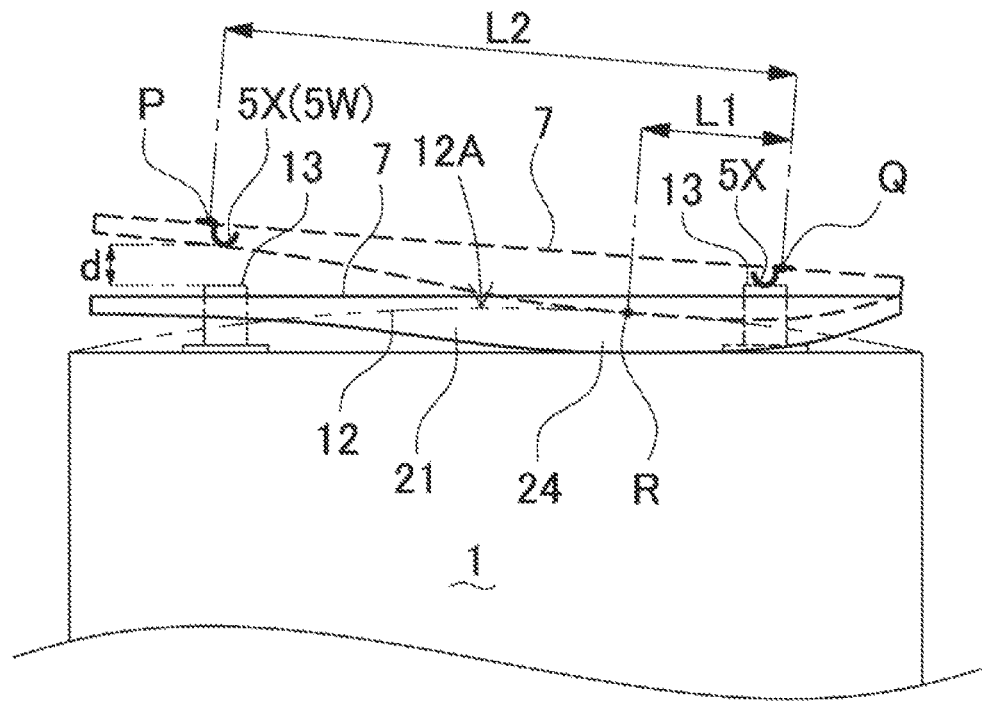
FIG. 14 is a schematic cross-sectional view showing another example of an insulating plate pushed up by a sealing plate.
Figure 15:
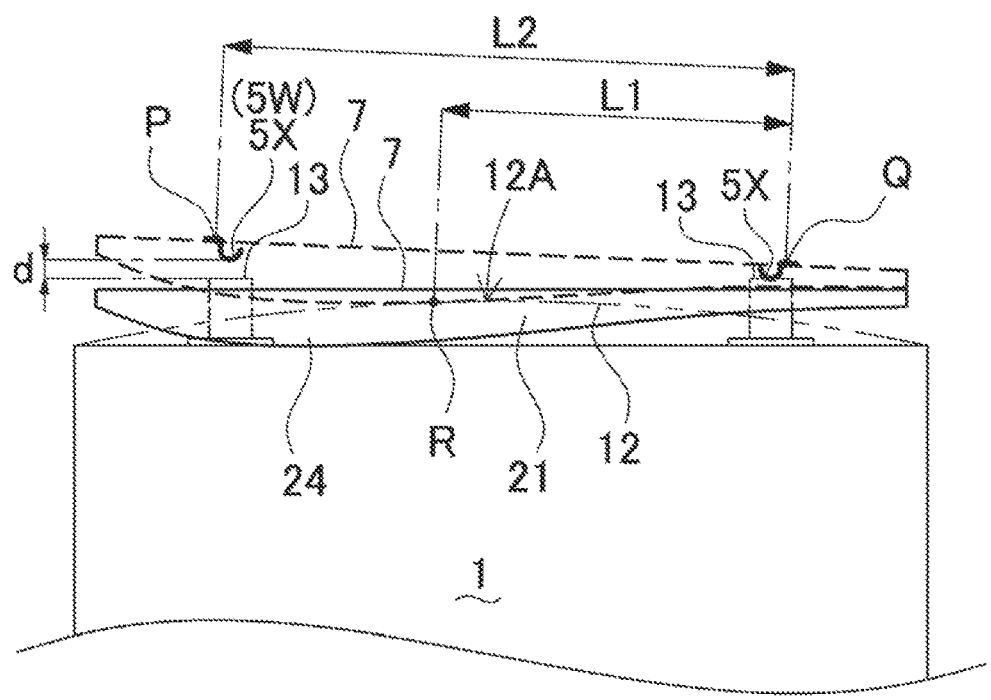
FIG. 15 is a schematic cross-sectional view showing another example of the insulating plate pushed up by the sealing plate.

The battery system can adjust leverage (L2/L1) to control gap (d) between separated electrode terminal 13 and bus bar 5. This is because the position of point R can be changed by changing the shape of the surface of insulating plate 7 which faces sealing plate 12. Insulating plate 7 illustrated in the cross-sectional views of FIGS. 14 and 15 makes the surface facing sealing plate 12 protrude to shift point R pressed by protruding sealing plate 12 in the longitudinal direction. Insulating plate 7 can increase leverage (L2/L1) by shifting the apex of protruding portion 24 protruding toward sealing plate 12 toward point Q from the central portion, as illustrated in FIG. 14, and decrease leverage (L2/L1) by shifting the apex of protruding portion 24 toward point P from the central portion, as illustrated in FIG. 15. By increasing leverage (L2/L1), gap (d) by which bus bar 5 separates from electrode terminal 13 can be increased. By decreasing leverage (L2/L1), the breaking force that separates bus bar 5 from electrode terminal 13 can be increased at point P. Gap (d) by which bus bar 5 separates from electrode terminal 13 and the breaking force that separates bus bar 5 from electrode terminal 13 at point P are mutually opposite characteristics. Therefore, leverage (L2/L1) is set at the optimum position in consideration of the separation distance and breaking force of bus bar 5.

When insulating plate 7 pushed up by protruding portion 12A of sealing plate 12 and pulled up by coupling portion 28 separates bus bar 5 from electrode terminal 13 and breaks bus bar 5 at point P, flat insulating plate 7 is pressed by the curved surface of protruding portion 12A and is inclined. In this state, inclined insulating plate 7 is configured such that the distance between points P and R is longer than the distance between points R and Q. This is because when insulating plate 7 is inclined, point R, which is the contact point between protruding portion 12A of sealing plate 12 and insulating plate 7, approaches point Q. As point R, which is the contact point, approaches point Q, the ratio between distance (L1) from point Q to point H and distance (L2) from point Q to point P, that is, leverage (L2/L1), increases, and the distance by which bus bar 5 is separated from electrode terminal 13 at point P, that is, gap (d) between electrode terminal 13 and bus bar 5, increases. When gap (d) between electrode terminal 13 and bus bar 5 increases, short-circuit current can be reliably cut off.

Figure 16:
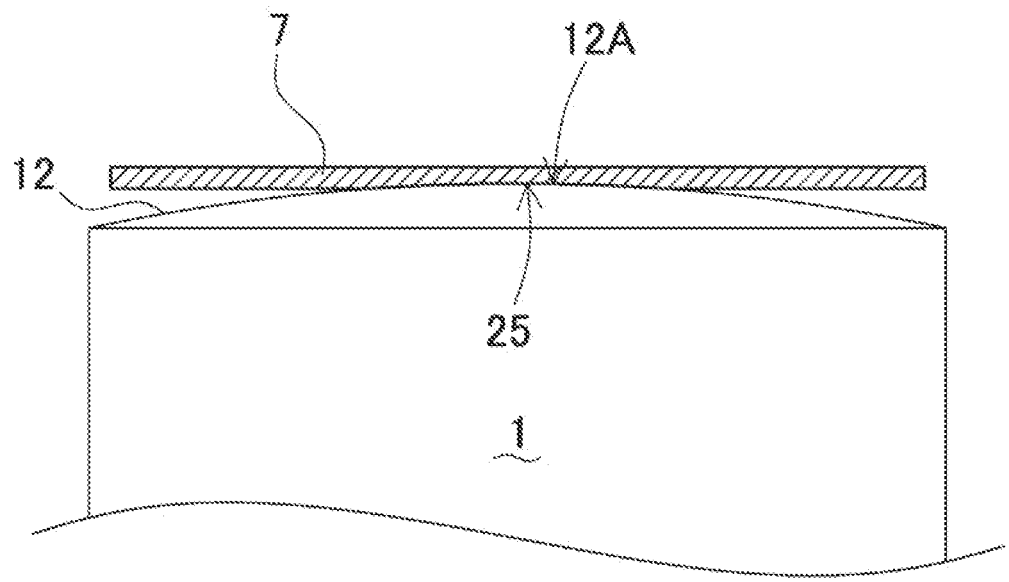
FIG. 16 is a schematic cross-sectional view showing another example of the insulating plate pushed up by the sealing plate.

Further, insulating plate 7 illustrated in the cross-sectional view of FIG. 16 has curved recess 25 for guiding protruding portion 12A on a surface facing sealing plate 12 so as to be pressed in a surface contact state by protruding portion 12A of sealing plate 12. Since insulating plate 7 is pressed against protruding portion 12A of sealing plate 12 in a surface contact state, insulating plate 7 is pushed up suitably and stably by flexible sealing plate 12.

In the above battery system, the connection portion between electrode terminal 13 and bus bar 5 is set to coupling strength that separates bus bar 5 from electrode terminal 13 when insulating plate 7 is pushed up by both the deformation of sealing plate 12 of square battery cell 1 in which the internal pressure rises and the kinetic energy of the exhaust gas ejected from discharge valve 14. In battery system 100, insulating plate 7 is pushed up with both the pushing force due to the deformation of sealing plate 12 of square battery cell 1 and the force of the exhaust gas ejected from discharge port 15 of discharge valve 14 with which lid plate 7 is pushed up, to break parallel connection bus bar 5X. This can greatly increase the breaking force of insulating plate 7 with respect to bus bar 5. This can increase the coupling strength that connects bus bar 5 to electrode terminal 13 and reliably prevent a malfunction in which bus bar 5 is separated from electrode terminal 13 due to external force such as vibration or impact.

Figure 17:
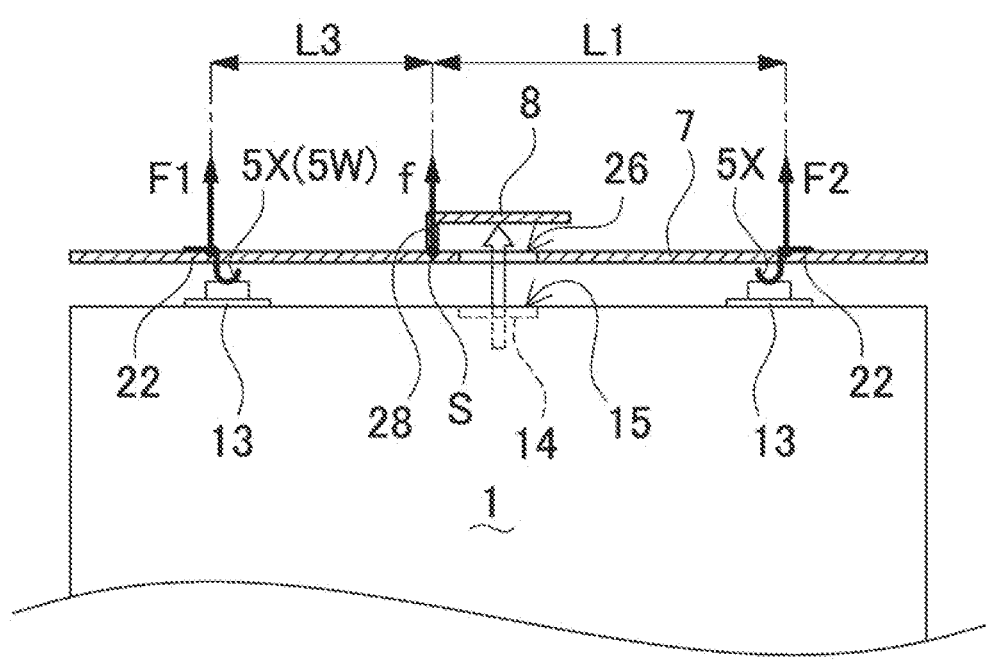
FIG. 17 is a schematic cross-sectional view showing another example in which the insulating plate cuts off a short-circuit current between parallel batteries.

However, in the battery system according to the present invention, as illustrated in FIG. 17, the exhaust gas ejected from discharge port 15 of discharge valve 14 pushes up insulating plate 7 only by the force pushing up the lid plate 7, and bus bar 5X connected in parallel can also be broken. In this battery system, insulating plate 7 is pushed up by the kinetic energy of the exhaust gas ejected from discharge port 15 when discharge valve 14 is opened. In this case, as illustrated in FIG. 17, position S at which coupling portion 28 pulls up insulating plate 7 becomes a force point, and breaking force F1 and breaking force F2 act at points P and Q as both ends of insulating plate 7 in the direction in which bus bar 5 is separated from electrode terminal 13. Since coupling portion 28 at the coupling position between insulating plate 7 and lid plate 8 is disposed toward point P from the center of discharge port 15, distance (L1) between points Q and S is longer than distance (L3) between points P and S. Therefore, breaking force F1 acting at point P and breaking force F2 acting at point Q are as follows with respect to pushing force f received by insulating plate 7 from coupling portion 28.

$$F1=f(L1+L3)/L3$$

$$F2=f(L1+L3)/L1$$

In this case, F1>F2 holds from L3<L1, and insulating plate 7 surely breaks weak bus bar 5W connected to point P. That is, position Q where bus bar 5 is pushed up and not separated is the fulcrum, position P where bus bar 5 is pushed up and separated is the action point, and weak bus bar 5W is separated from electrode terminal 13 and broken. Accordingly, the connection portion between electrode terminal 13 and weak bus bar 5W is set to coupling strength that separates bus bar 5 from electrode terminal 13 when insulating plate 7 is pushed up by the kinetic energy of the exhaust gas ejected from discharge valve 14.

In the above battery system, the coupling strength between electrode terminal 13 and bus bar 5 is adjusted with the area where bus bar 5 is welded to electrode terminal 13. This is because the welding area between electrode terminal 13 and bus bar 5 can be reduced to weaken the coupling strength, and conversely, the welding area can be increased to increase the coupling strength. The coupling strength between bus bar 5 and electrode terminal 13 can be adjusted by the shape of the welded portion between electrode terminal 13 and bus bar 5. Bus bar 5 fixed by spot welding can be adjusted by a fusing current. Bus bar 5 fixed by laser welding can be adjusted by the output of a laser beam used for laser welding, the irradiation area of the laser beam, and the irradiation time. Bus bar 5 welded to electrode terminal 13 by ultrasonic vibration can be adjusted by the output of an ultrasonic transducer, pressing force, and the ultrasonic vibration time and can also be adjusted by, for example, the types of metal materials for electrode terminal 13 and bus bar 5.

Insulating plate 7 can also cut off a part of parallel connection bus bar 5X to instantaneously interrupt the short-circuit current. Although not illustrated, parallel connection bus bar 5X is processed to have a narrow width or a portion to be cut is thinned to forcibly weaken the tensile strength to cut off a short-circuit current. Parallel connection bus bar 5X is provided with a cut portion formed by providing a notch in a metal plate so as to have a narrow portion at a central portion or a cut portion formed by thinly forming a part of a metal plate by press working or cutting so as to weaken the tensile strength. With this structure, bas bar 5X is broken or cut at this portion when pushed up by pressing portion 22. It should be noted that parallel connection bus bar 5X need not necessarily be broken by only the mechanical action of pressing portion 22 and may be configured to be broken by the synergistic effect of pressing by pressing portion 22 and the heat generated by a current flowing through the cut portion of parallel connection bus bar 5X.

The above battery system is most suitable as a power source for a vehicle that supplies electric power to a motor that runs an electric vehicle. As an electric vehicle equipped with a battery system, an electric vehicle such as a hybrid vehicle or a plug-in hybrid vehicle that run on both an engine and a motor, or an electric vehicle that runs only on a motor can be used, and is used as a power source for these electric vehicles.

(Battery System for Hybrid Vehicle)

Figure 18:
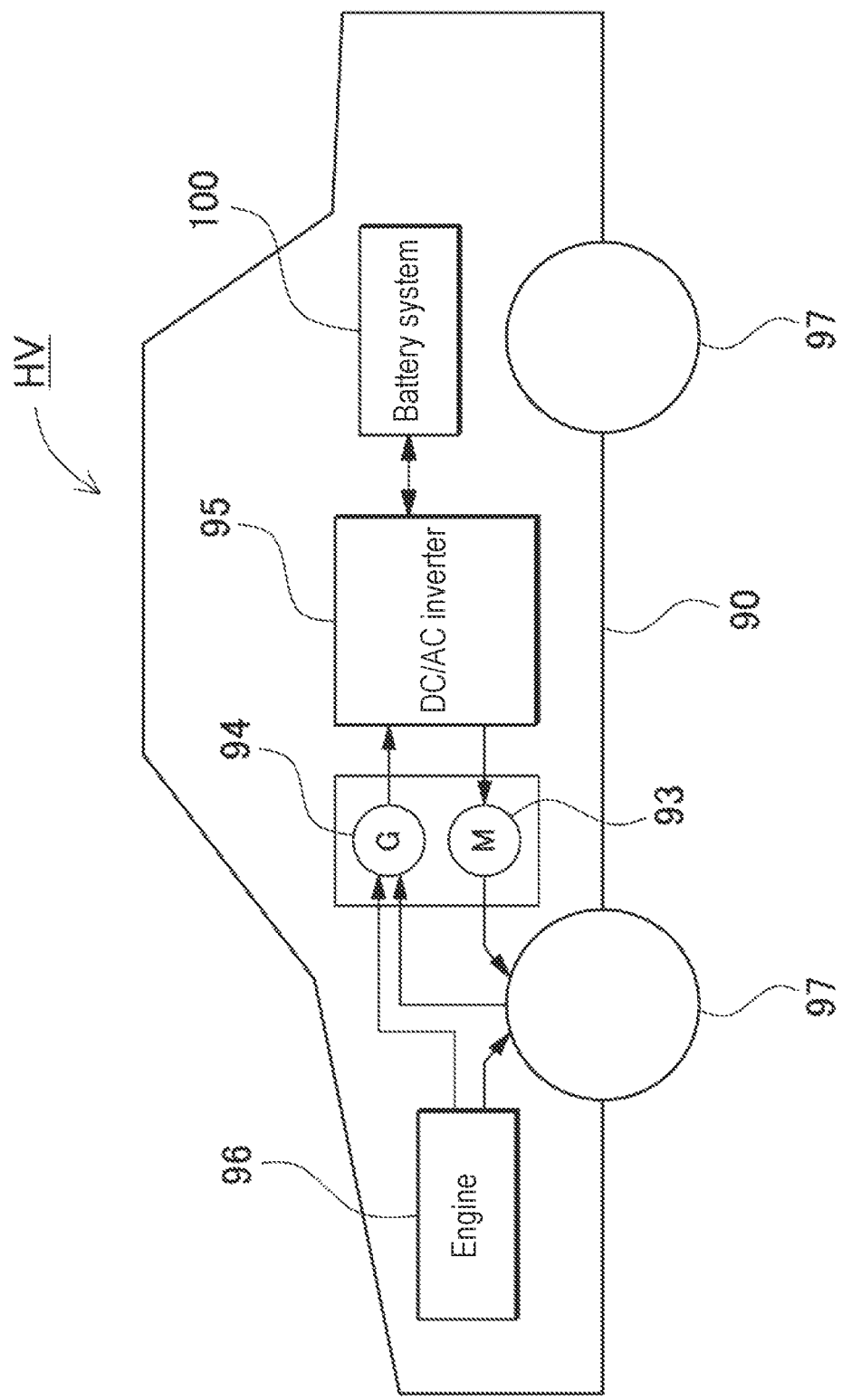
FIG. 18 is a block diagram showing an example in which a battery system is mounted on a hybrid car running on an engine and a motor.

FIG. 18 illustrates an example in which a battery system is installed in a hybrid vehicle that runs on both an engine and a motor. Vehicle HV equipped with the battery system illustrated in FIG. 18 includes vehicle body 90, engine 96 and running motor 93 that run vehicle body 90, battery system 100 that supplies power to motor 93, generator 94 that charges the battery of battery system 100, and wheels 97 that are driven by motor 93 and engine 96 to run vehicle body 90. Battery system 100 is connected to motor 93 and generator 94 via DC/AC inverter 95. Vehicle HV runs on both motor 93 and engine 96 while charging and discharging the battery of battery system 100. Motor 93 is driven to run the vehicle in a region where the engine efficiency is for example, when accelerating or traveling at a low speed. Motor 93 is driven by being supplied with electric power from battery system 100. Generator 94 is driven by engine 96 or by regenerative braking upon braking of the vehicle to charge the batteries of battery system 100.

(Battery System for Electric Vehicle)

Figure 19:
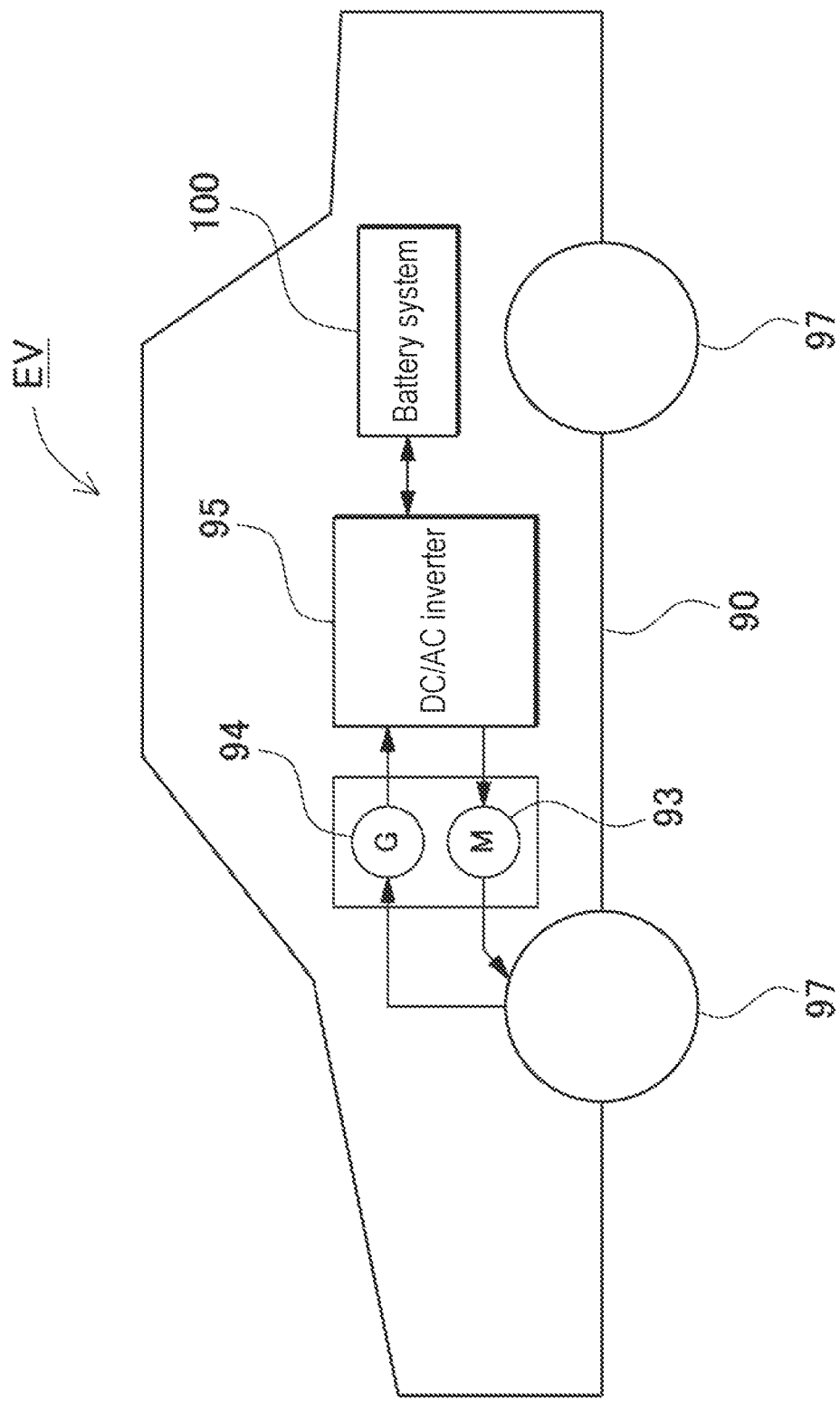
FIG. 19 is a block diagram showing an example in which a battery system is mounted on an electric vehicle that runs only on a motor.

FIG. 19 illustrates an example in which a battery system is mounted on an electric vehicle that runs only on a motor. Vehicle EV equipped with the battery system illustrated in this figure includes vehicle body 90, running motor 93 that runs vehicle body 90, battery system 100 that supplies power to motor 93, generator 94 that charges the battery of battery system 100, and wheels 97 that are driven by motor 93 to run vehicle body 90. Motor 93 is driven by being supplied with electric power from battery system 100. Generator 94 is driven by the energy used for regenerative braking of vehicle EV to charge the battery of battery system 100.

(Battery System for Storage)

Figure 20:
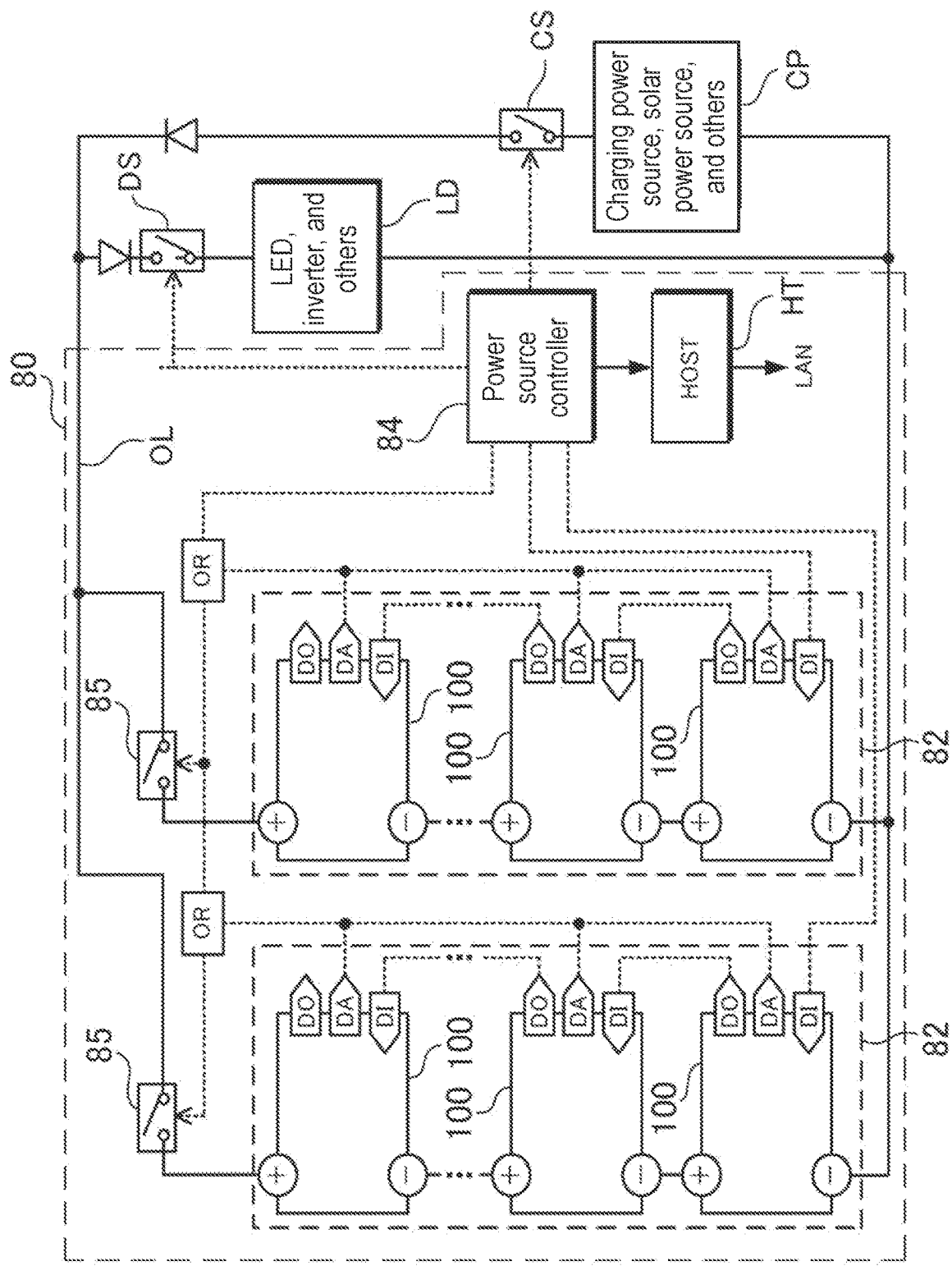
FIG. 20 is a block diagram showing an example of using a battery system for an electric storage device.

Furthermore, the present invention does not specify the use of the battery system to the battery system mounted on an electric vehicle, and can be used as, for example, a battery system for an electric storage device that stores natural energy such as solar power generation and wind power generation. In addition, this battery system can be used for all purposes of storing a large amount of electric power, such as a battery system for an electric storage device that stores electric power at midnight. For example, the battery system can also be used as a power source system serving as a power source for homes or factories, which charges with sunlight or midnight power and discharges when necessary, a power source for street lights which charges with sunlight during the day and discharges at night, or a backup power source for traffic lights, which is driven during a power outage. FIG. 20 illustrates such an example. The electric storage device illustrated in FIG. 20 will exemplify its use as large-capacity and high-output electric storage device 80 that is formed by connecting a plurality of above battery systems in series or in parallel to obtain desired power and adding a necessary control circuit.

Electric storage device 80 illustrated in FIG. 20 includes power source unit 82 obtained by connecting a plurality of battery systems 100 in a unit shape. In each battery system 100, a plurality of square battery cells are connected in series and/or in parallel. Each battery system 100 is controlled by power controller 84. Electric storage device 80 drives load LD after charging power source unit 82 with charging power source CP. Therefore, electric storage device 80 includes a charge mode and a discharge mode. Load LD and charging power source CP are connected to electric storage device 80 via discharge switch DS and charging switch CS, respectively. Discharge switch DS and charge switch CS are ON/OFF switched by power controller 84 of electric storage device 80. In the charging mode, power controller 84 turns on charging switch CS and turns off discharge switch DS to allow charging from charging power CP to electric storage device 80. In addition, when electric storage device 80 is fully charged or charged to a capacity of a predetermined value or more, power controller 84 allows discharging from electric storage device 80 to load LD by turning off charging switch CS and turning on discharge switch DS in response to a request from load LD. Further, power supply to load LD and charging of electric storage device 80 can be simultaneously performed as needed by turning on charge switch CS and turning on discharge switch DS.

Load LD driven by electric storage device 80 is connected to electric storage device 80 via discharge switch DS. In the discharge mode of electric storage device 80, power controller 84 turns on discharge switch DS, connects to load LD, and drives load LD with power from electric storage device 80. A switching element such as a field-effect transistor (FET) can be used as discharge switch DS. Discharge switch DS is ON/OFF-controlled by power controller 84 of electric storage device 80. Power controller 84 also has a communication interface for communicating with an external device. In the example in FIG. 20, power controller 84 is connected to host device HT in accordance with an existing communication protocol such as universal asynchronous receiver-transmitter (UART) or RS-232C. Further, a user interface for the user to operate the power source system can be provided as needed.

Each battery system 100 includes a signal terminal and a power source terminal. The signal terminal includes input/output terminal DI, abnormality output terminal DA, and connection terminal DO. Input/output terminal DI is a terminal for inputting/outputting signals from/to another battery system 100 or power controller 84, and connection terminal DO is a terminal for inputting/outputting signals from/to another battery system 100. Abnormality output terminal DA is a terminal for outputting an abnormality of battery system 100 to the outside. Further, the power source terminal is a terminal for connecting battery systems 100 in series or in parallel. Further, power source unit 82 is connected in parallel with output line OL via parallel connection switch 85.

INDUSTRIAL APPLICABILITY

The battery system according to the present invention and an electric vehicle and an electric storage device each provided with the battery system are suitable as a battery system for a plug-in hybrid electric vehicle, a hybrid electric vehicle, an electric vehicle, and the like that can switch between an EV driving mode and an HEV driving mode. In addition, this electric storage device can also be used as appropriate for backup power sources that can be mounted in computer server racks, backup power sources for wireless base stations for mobile phones and the like, power storage power sources for homes and factories, power sources for street lights, electric storage devices combined with solar cells, and backup power sources for traffic lights and the like.

REFERENCE MARKS IN THE DRAWINGS 100 battery system.
1 square battery cell
2 battery block
3 end plate
4 bind bar
5 bus bar
5X parallel connection bus bar
5Y series connection bus bar
5W weak bus bar
7 insulating plate
8 lid plate
10 parallel battery unit
11 package can
12 sealing plate
12A protruding portion
13 electrode terminal
13a flat plate portion
14 discharge valve
15 discharge port
16 Insulating material
17 slit
18 current collecting member
19 separator
21 plate portion
22 pressing portion
23 through hole
24 protruding portion
25 curved recess
26 passing portion
28 coupling portion
30 current cutoff mechanism
31 CID
80 electric storage device
82 power source unit
84 power source controller
85 parallel connection switch
90 vehicle body
93 motor
94 generator
95 DC/AC inverter
96 engine
97 wheel
EV vehicle
HV vehicle
LD load
CP power source for charging
DS discharge switch
CS charging switch
OL output line HT host device
DI input/output terminal.
DA abnormal output terminal
DO connection terminal

The invention claimed is:

1. A battery system comprising:
a battery block including a plurality of prismatic battery cells stacked in one direction, each of the plurality of prismatic battery cells having a discharge port provided with a discharge valve that opens at a set pressure and a sealing plate provided with positive and negative electrode terminals via an insulating material;
a parallel connection bus bar configured to be connected to an electrode terminal of each of the plurality of prismatic battery cells and connect some or all of the plurality of prismatic battery cells in parallel with each other;
an insulating plate disposed on a surface of the sealing plate of each of the plurality of prismatic battery cells, the insulating plate including a passing portion provided at positions corresponding to the discharge port and having an opening that passes exhaust gas ejected from the discharge port and a pressing portion disposed between the parallel connection bus bar and the sealing plate; and
a lid plate fixed to the insulating plate and facing the discharge port facing the opening of the passing portion,
wherein the insulating plate is configured to move away from the battery block at least in a thickness direction of the sealing plate where a force exerted by the exhaust gas acts on the insulating plate via the lid plate,
wherein the battery block includes a plurality of parallel-connected units, formed by connecting the prismatic battery cells in parallel, connected to each other in series,
wherein the insulating plate has a slit extending in a width direction of the prismatic battery cells and between adjacent parallel-connected units among the plurality of parallel-connected units, and
wherein the insulating plate is configured to break at the slit so as to allow only part of the insulating plate to move away from the battery block where the force exerted by the exhaust gas acts on the insulating plate via the lid plate.

2. The battery system according to claim 1, wherein the insulating plate is provided between adjacent parallel-connected units among the plurality of parallel-connected units so as to have a plurality of slits extending in the width direction of the prismatic battery cells.

3. The battery system according to claim 2, wherein the lid plate and the insulating plate are connected between adjacent slits among the plurality of slits, and a coupling position where the lid plate and the insulating plate are connected, being the coupling position between the adjacent slits is eccentrically located only on one side of a center of the discharge port in the width direction of the prismatic battery cells.

4. The battery system according to claim 3, wherein the coupling position between the adjacent slits is provided at a position close to the electrode terminal on the positive side with respect to the plurality of prismatic battery cells located below the coupling position and connected in parallel with each other.

5. The battery system according to claim 1, wherein the sealing plate is a flexible plate material that deforms when an internal pressure rises due to an abnormality in one of the prismatic battery cells, and a displacement amount of the sealing body accompanying a rise in internal pressure due to the abnormality in the one of the prismatic battery cells is larger than a gap between the parallel connection bus bar and the pressing portion.

6. The battery system according to claim 1, wherein the parallel connection bus bar has a cut portion, formed at a portion to which the pressing portion of the insulating plate abuts, so as to have lower strength than other portions.

7. An electric vehicle including the battery system according to claim 1, the electric vehicle comprising:
the battery system;
a running motor supplied with electric power from the battery system;
a vehicle main body equipped with the battery system and the running motor; and
a wheel that is driven by the running motor to drive the vehicle main body.

8. An electric storage device including the battery system according to claim 1, the electric storage device comprising:
the battery system; and
a power source controller configured to control charging and discharging with respect to the battery system, the power source controller causing the prismatic battery cells to be charged with electric power from outside and performing control to charge the prismatic battery cells.

* * * * *